US006003971A

United States Patent [19]

Hanks et al.

[11] Patent Number: 6,003,971

[45] Date of Patent: Dec. 21, 1999

[54] HIGH-PERFORMANCE INK JET PRINT HEAD HAVING AN IMPROVED INK FEED SYSTEM

[75] Inventors: David W. Hanks, Portland; Meade Neal, Mulino; Sharon S. Berger, Salem; Donald B. Maclane, Portland; Nasser Alavizadeh, Tigard; Ronald F. Burr, Wilsonville; William H. Tomison, Beaverton, all of Oreg.

[73] Assignee: Tektronix, Inc., Wilsonville, Oreg.

[21] Appl. No.: 08/610,564

[22] Filed: Mar. 6, 1996

[51] Int. Cl.[6] ................................ B41J 2/21; B41J 2/045; A47J 27/00; H05B 1/00

[52] U.S. Cl. .............................. 347/43; 347/71; 392/441; 219/216

[58] Field of Search ................................. 347/71, 70, 68, 347/43, 88, 17; 392/441, 445; 219/216

[56] References Cited

U.S. PATENT DOCUMENTS

| | | | |
|---|---|---|---|
| 3,747,120 | 7/1973 | Stemme | 347/70 |
| 4,367,480 | 1/1983 | Kotoh | 347/71 |
| 4,380,771 | 4/1983 | Takatori | 347/43 |
| 4,538,156 | 8/1985 | Durkee et al. | 346/21 |
| 4,730,197 | 3/1988 | Raman et al. | 346/140 R |
| 4,809,024 | 2/1989 | DeYoung et al. | 347/94 |
| 4,883,219 | 11/1989 | Anderson et al. | 228/190 |
| 5,087,930 | 2/1992 | Roy et al. | 346/140 R |
| 5,424,767 | 6/1995 | Alavizadeh et al. | 347/88 |
| 5,455,615 | 10/1995 | Burr et al. | 347/92 |
| 5,614,933 | 3/1997 | Hindman et al. | 347/88 |

*Primary Examiner*—Peter S. Wong
*Assistant Examiner*—Bao Q. Vu
*Attorney, Agent, or Firm*—Ralph D'Alessandro

[57] ABSTRACT

An ink jet array print head (101) includes four media-width linear ink jet arrays (100). Ink flows from four sets of manifolds (106) through acoustically matched inlet filters (116), inlet ports (117), inlet channels (118), pressure chamber ports (120), and ink pressure chambers (122). Ink leaves the pressure chambers through outlet ports (124) and flows through oval outlet channels (128) to orifices (108), from which ink drops (110) are ejected. The ink pressure chambers are bounded by flexible diaphragms (130) to which piezo-ceramic transducers (132) are bonded. To minimize inter-jet cross-talk caused by pressure fluctuations in the manifolds, compliant walls (150) form one wall along the entire length of each manifold. An improved ink feed system (210) supplies four colors of ink to the print head. Phase-change inks are melted and deposited in ink catch basins (202), funneled into ink storage reservoirs (204), and fed to the print head through ink stack feeds (206) having substantially equal lengths and cross-sectional areas to improve jetting uniformity. Manifold tapering, inlet port positioning, and an elevationally upward slope of the ink stack feeds enhances purgeability of the ink feed system and the ink jet print head.

14 Claims, 17 Drawing Sheets

HIGH-PERFORMANCE INK JET PRINT HEAD HAVING AN IMPROVED INK FEED SYSTEM

TECHNICAL FIELD

This invention relates to drop-on-demand ink jet print heads and in particular to a high-performance, print media-width print head incorporating multiple arrays of ink jets that are optimized for purgeability, jetting uniformity, and high drop-ejection rate performance.

BACKGROUND OF THE INVENTION

There are well-known apparatuses and methods for implementing multiple-orifice drop-on-demand ink jet print heads. In general, each ink jet of a multiple-orifice drop-on-demand ink jet array print head operates by the displacement of ink in an ink pressure chamber and the subsequent ejection of ink droplets from an associated orifice. Ink is supplied from a common ink supply manifold through an ink inlet to the ink pressure chamber. A driver mechanism is used to displace the ink in the ink pressure chamber. The driver mechanism typically includes a transducer (e.g., a piezo-ceramic material) bonded to a thin diaphragm. When a voltage is applied to the transducer, it displaces ink in the ink pressure chamber, causing the ink to flow through the inlet from the ink manifold to the ink pressure chamber and through an outlet and passageway to the orifice.

It is desirable to employ a geometry that permits the multiple orifices to be positioned in a densely packed array. Suitably arranging the manifolds, inlets, pressure chambers, and the fluidic couplings of the chambers to associated orifices is not a straightforward task, especially when compact ink jet array print heads are sought. Incorrect design choices, even in minor features, can cause nonuniform jetting performance.

Uniform jetting performance is generally accomplished by making the various features of each ink jet array channel substantially identical. Uniform jetting also depends on each channel being free of air, contaminants, and internally generated gas bubbles that can form in the print head and interfere with jetting performance. Therefore, the various features of the multiple-orifice print head must also be designed for effective purging.

For example, U.S. Pat. No. 4,730,197 issued Mar. 8, 1988 for IMPULSE INK JET SYSTEM describes an ink jet array print head having two parallel rows of generally rectangular ink pressure chambers positioned with their centers aligned. Each one of a linear array of ink jet orifices are coupled to an associated ink pressure chamber. The central axis of each orifice extends normal to the plane containing the ink pressure chambers and intersects an extension portion of the ink pressure chamber. An ink manifold of substantially uniform cross-sectional area supplies ink to each of the chambers through a restrictive opening that acts to minimize acoustic cross-talk between adjacent channels of the multiple orifice array. However, such restrictions often trap bubbles and, as a consequence, require frequent purging. Also described is the effect of pressure chamber resonances on jetting uniformity and the use of dummy channels and compliant wall structures to reduce reflected wave-induced cross-talk in a 36-orifice ink jet print head.

Effective purging depends on a relatively rapid ink flow rate through the various features of an ink jet print head to sweep away bubbles and contaminants. Ink flow rate at various locations in an ink manifold depends on the number of downstream orifice channels being purged and the cross-sectional area of the manifold. The flow rate is, therefore, greater at the upstream end of the manifold than at the downstream end where only a single orifice channel is drawing ink. Consequently, the ink flow rate at the downstream end of the manifold may not be sufficient to sweep away entrapped bubbles and contaminants.

Some ink flow rate and nonuniformity problems are addressed in U.S. Pat. No. 4,367,480 issued Jan. 4, 1983 for HEAD DEVICE FOR INK JET PRINTER, which describes a multiple-orifice ink jet print head having uniform feature sizes in each orifice channel and an ink manifold having a nonuniform cross-sectional area that provides increased flow rate at its downstream end. However, the manifold is shaped such that flow stagnation regions can still entrap bubbles or contaminants. The print head further includes a serpentine ink inlet configuration that provides uniform acoustic performance among orifice channels and an ink supply manifold having ink inlets at both ends. Such a configuration provides for rapid ink flow rate in one ink inlet, through the manifold, and out the other inlet (cross-flow purging) that effectively removes contaminants or bubbles from the ink manifold but not from the various features of each orifice channel.

Printing speed and jetting uniformity are addressed in U.S. Pat. No. 5,087,930 issued Feb. 11, 1992 for DROP-ON-DEMAND INK JET PRINT HEAD, assigned to the assignee of this application, which describes a compact 96-orifice ink jet print head having acoustically uniform internal features. The print head is constructed of laminated plates that together form associated arrays of ink manifolds, diaphragms, ink pressure chambers, ink inlets, offset channels, and orifices. Particular plates also form black, yellow, magenta, and cyan ink manifolds that are distributed elevationally above and below the other internal ink jet features. In particular, the elevationally lower manifolds are connected to the upper manifolds by ink communication channels. Unfortunately, during periods of no printing, buoyant bubbles can become entrapped in an upper arch of the ink communication channel, and when printing, the rate of ink flow is insufficient to sweep the bubbles away through any of the ink supply channels of the print head. During purging, ink is caused to flow at an increased rate through the manifolds and ink supply channels, causing the bubbles to be drawn toward the downstream end of the upper manifold where they are unfortunately entrapped in a stagnation region.

Entrapped bubbles are a particularly serious problem because each bubble has a resonant frequency that acts to increase cross-talk among ink jet channels whenever an ink orifice channel ejects ink drops at a rate near the resonant frequency of the bubble. Moreover, at some ink drop ejection rates, sufficient energy is transferred to the bubble to cause it to grow and ultimately prevent the associated ink jet from operating.

Some solutions to bubble entrapment are addressed in U.S. Pat. No. 5,455,615, issued Oct. 3, 1995, for A MULTIPLE-ORIFICE DROP-ON-DEMAND INK JET PRINT HEAD HAVING IMPROVED PURGING AND JETTING PERFORMANCE, which is assigned to the assignee of this application. A 124-orifice ink jet print head is described in which the manifolds are tapered to eliminate ink flow stagnation regions. Further, the manifolds and ink supply channels are all tilted elevationally upward and include inlet channel ports distributed along the upper edges of the manifolds such that the buoyancy of bubbles causes them to float upward in the manifolds and be easily swept into an ink supply channel. Moreover, the tapering and sizing of the manifolds and other internal ink jet features minimizes cross-talk and resonance-induced jetting nonuniformities. However, even with 124 orifices, a printer employing the print head still requires two minutes to produce a color print.

A solution to the printing speed problem is addressed in U.S. Pat. No. 4,538,156 issued Aug. 27, 1985 for INK-JET PRINTER, which describes an ink jet image transfer printer that employs a print media-width print head that ejects image-forming ink drops directly onto a rapidly rotating drum. The media-width print head employs a linear array of ink jet orifices that are spaced apart by 0.254 millimeter (0.1 inch) to print a 79 dots per centimeter (200 dots per inch) resolution image on the drum during 20 successive rotations thereof during which time the print head is laterally moved. After the drum receives the image, a print medium is placed in rolling contact with the drum to transfer the image from the drum to the print medium. Such transfer printing is advantageous because of relatively high-speed printing, insensitivity to print media thickness, and a simplified "straight through" paper path. However, the above-described printer cannot produce color prints nor can the print head orifice spacing support a printing resolution of 118 dots per centimeter (300 dots per inch) or greater.

Despite the numerous prior multiple-orifice ink jet print head designs, a need still exists for a manufacturable, purgable, ink jet print head that can produce multiple high-resolution, high-quality color prints per minute.

SUMMARY OF THE INVENTION

An object of this invention is, therefore, to provide a high-speed, high-resolution, media-width, color ink jet printing apparatus.

Another object of this invention is to provide the ink jet print head with an internal feature arrangement and sizing that results in excellent purgeability and uniform jetting characteristics.

A further object of this invention is to provide an improved ink feed system for the above-mentioned ink jet print head.

Accordingly, this invention provides an ink jet array print head that includes four media-width ink jet arrays for printing full-color images. Ink flows from four ink manifolds through acoustically matched sets of inlet filters, inlet ports, inlet channels, pressure chamber ports, and ink pressure chambers. Ink leaves the pressure chambers by way of outlet ports and flows through oval outlet channels to orifices, from which ink drops are ejected. The ink pressure chambers are bounded by flexible diaphragms to which piezo-ceramic transducers are bonded. To minimize inter-jet cross-talk caused by pressure fluctuations in the manifolds, a compliant wall is formed along the entire length of each manifold. An ink feed system supplies four colors of ink to the print head. Phase-change inks are melted and deposited in ink catch basins, funneled into ink storage manifolds, and fed to the print head through multiple ink stack feeds having substantially equal lengths and cross-sectional areas to improve jetting uniformity. Manifold tapering, inlet port positioning, and an elevationally upward slope of the ink stack feeds enhance purgeability of the ink feed system and the ink jet print head.

Additional objects and advantages of this invention will be apparent from the following detailed description of a preferred embodiment thereof that proceeds with reference to the accompanying drawings.

DETAILED DESCRIPTION OF A PREFERRED EMBODIMENT

A transfer printing process and ink compositions suitable for use with this invention are described in U.S. Pat. No. 5,389,958 for IMAGING PROCESS and U.S. Pat. No. 5,372,852 for PROCESS FOR APPLYING SELECTIVE PHASE CHANGE INK COMPOSITIONS TO SUBSTRATES IN INDIRECT PRINTING PROCESSES, both of which were filed Nov. 25, 1992 and are assigned to the assignee of this application.

Figure 1:
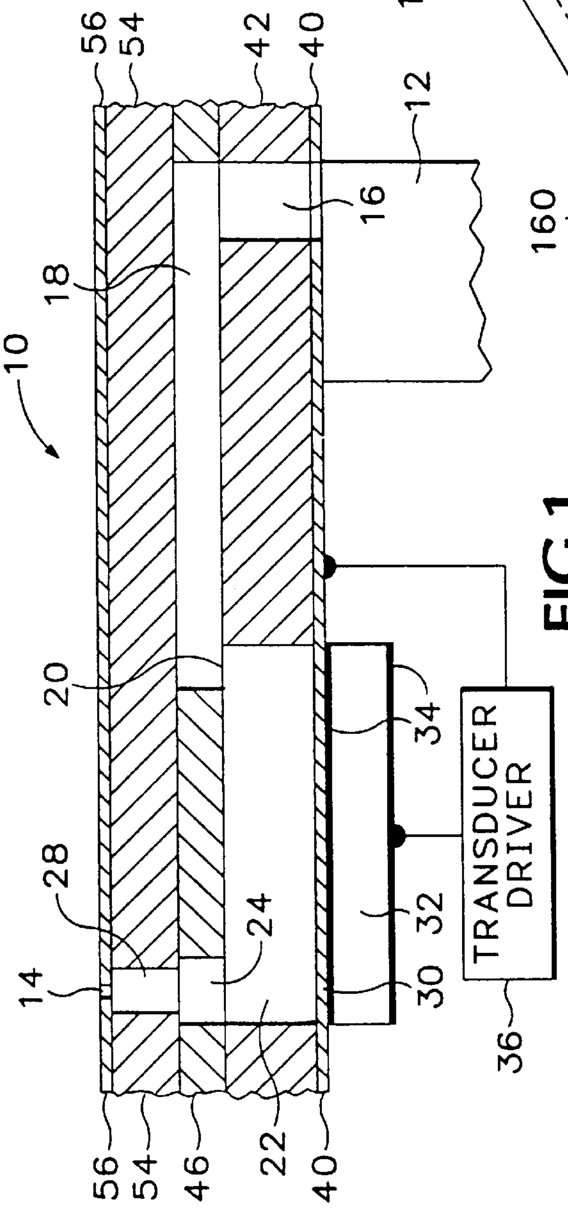
FIG.1 (PRIOR ART)
FIG. 1 is an enlarged diagrammatical cross-sectional view of an exemplary piezo-ceramic transducer driven ink jet showing a plate-stacking arrangement of internal features thereof suitable for use in an ink jet array print head of this invention.

FIG. 1 cross-sectionally shows an exemplary single ink jet 10 that is suitable for use in a high-resolution color ink jet array print head of this invention. Ink jet 10 has a body that defines an ink manifold 12 through which ink is delivered to the ink jet print head. The body also defines an ink drop-forming orifice 14 together with an ink flow path from ink manifold 12 to orifice 14. In general, the ink jet print head preferably includes an array of orifices 14 that are closely spaced apart from one another for use in ejecting drops of ink onto an image-receiving medium (not shown), such as a sheet of paper or a transfer drum.

A typical ink jet print head has at least four manifolds for receiving black ("K"), cyan ("C"), magenta ("M"), and yellow ("Y") ink for use in black plus subtractive three-color printing. (Hereafter, reference numerals pertaining to ink jet features carrying a particular ink color will further include an appropriate identifying suffix, e.g., manifold 12K, and features will be referred to collectively or generally without a suffix, e.g., manifold 12.) However, the number of such manifolds may be varied depending upon whether a printer is designed to print solely in black ink or with less than a full range of color. Ink flows from manifold 12 through an inlet port 16, an inlet channel 18, a pressure chamber port 20 and into an ink pressure chamber 22. Ink leaves pressure chamber 22 by way of an outlet port 24 and flows through an outlet channel 28 to nozzle 14, from which ink drops are ejected. Alternatively, an offset channel may be added between pressure chamber 22 and orifice 14 to suit particular ink jet applications.

Ink pressure chamber 22 is bounded on one side by a flexible diaphragm 30. An electromechanical transducer 32, such as a piezo-ceramic transducer, is secured to diaphragm 30 by an appropriate adhesive and overlays ink pressure chamber 22. In a conventional manner, transducer 32 has metal film layers 34 to which an electronic transducer driver 36 is electrically connected. Although other forms of transducers may be used, transducer 32 is operated in its bending mode such that when a voltage is applied across metal film layers 34, transducer 32 attempts to change its dimensions. However, because it is securely and rigidly bonded to the diaphragm, transducer 32 bends, deforming diaphragm 30, and thereby displacing ink in ink pressure chamber 22, causing the outward flow of ink through outlet port 24 and outlet channel 28 to orifice 14. Refill of ink pressure chamber 22 following the ejection of an ink drop is augmented by reverse bending of transducer 32 and the concomitant movement of diaphragm 30.

To facilitate manufacture of an ink jet array print head usable with the present invention, ink jet 10 is preferably formed of multiple laminated plates or sheets, such as of stainless steel. These sheets are stacked in a superimposed relationship. In the illustrated FIG. 1 embodiment of this invention, these sheets or plates include a diaphragm plate 40, which forms diaphragm 30 and a portion of manifold 12; an ink pressure chamber plate 42, which defines ink pressure chamber 22 and a portion of manifold 12; an inlet channel plate 46, which defines inlet channel 18 and outlet port 24; an outlet plate 54, which defines outlet channel 28; and an orifice plate 56, which defines orifice 14 of ink jet 10.

More or fewer plates than those illustrated may be used to define the various ink flow passageways, manifolds, and pressure chambers of the ink jet print head. For example, multiple plates may be used to define an ink pressure chamber instead of the single plate illustrated in FIG. 1. Also, not all of the various features need be in separate sheets or layers of metal. For example, patterns in the photoresist that are used as templates for chemically etching the metal (if chemical etching is used in manufacturing) could be different on each side of a metal sheet. Thus, as a more specific example, the pattern for the ink inlet passage could be placed on one side of the metal sheet while the pattern for the pressure chamber could be placed on the other side and in registration front-to-back. Thus, with carefully controlled etching, separate ink inlet passage- and pressure chamber-containing layers could be combined into one common layer.

Figure 2:
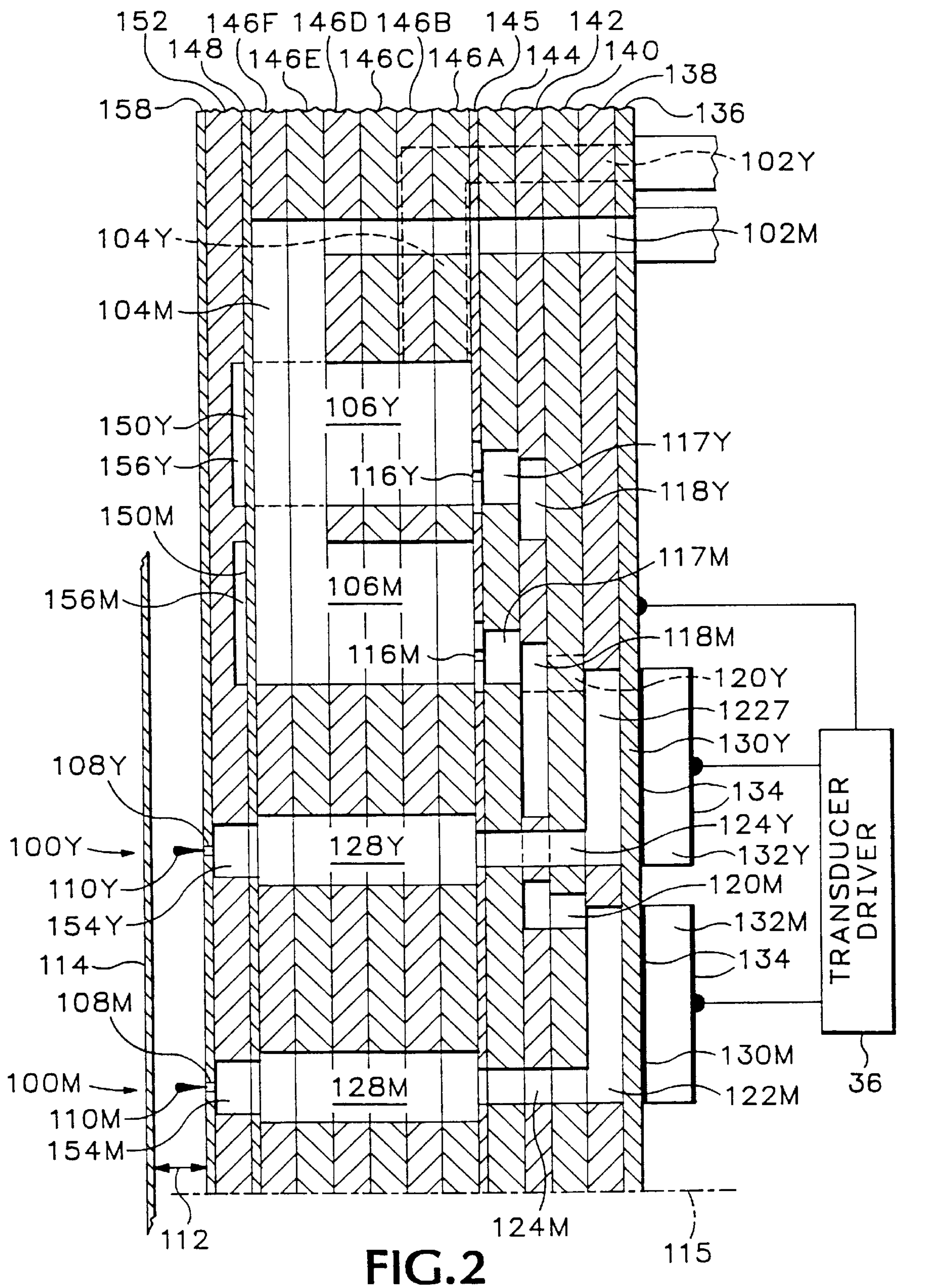
FIG. 2 is an enlarged diagrammatical cross-sectional view of a preferred ink jet array print head of this invention showing a plate-stacking arrangement of two piezo-ceramic transducer-driven ink jets thereof suitable for ejecting different colored ink drops.

FIG. 2 cross-sectionally shows a preferred plate stack arrangement for constructing ink jets 100Y and 100M that are a representative pair employed in a media-width, high-resolution, color ink jet array print head ("print head") 101 of this invention. Ink jets 100 are formed in a body that defines ink inlet ports 102Y and 102M, ink feed channels 104Y and 104M, and ink manifolds 106Y and 106M through which ink is delivered to respective ink jets 100Y and 100M. The body also defines ink drop-forming orifices 108Y and 108M from which ink drops 110Y and 110M are ejected across a distance 112 toward an image-receiving medium 114.

In general, preferred print head 101 includes four linear arrays of ink jets 100Y, 100M, 100C, and 100K that are closely spaced apart from one another for use in ejecting patterns of ink drops 110 toward image-receiving medium 114. Only ink jets 100Y and 100M are shown, but if FIG. 2 is "mirror imaged" around a centerline 115 (also refer to FIG. 3), a four ink jet cross-sectional configuration results in which four of manifolds 106 receive black, cyan, magenta, and yellow ink for use in black plus subtractive three-color printing.

Using any ink color as an example, ink flows from manifolds 106 through inlet filters 116, inlet ports 117, inlet channels 118, and pressure chamber ports 120 into ink pressure chambers 122. Ink leaves pressure chambers 122 by way of outlet ports 124 and flows through cross-sectionally oval outlet channels 128 to orifices 108, from which ink drops 110 are ejected.

Ink pressure chambers 122 are bounded on one side by flexible diaphragms 130. Disk-shaped 2.13-millimeter (0.084-inch) diameter, 0.15-millimeter (0.006-inch) thick transducers 132 are secured to diaphragms 130 by an appropriate adhesive to overlay respective ink pressure chambers 122. Transducers 132 have metal film layers 134 to which electronic transducer driver 36 is electrically connected. Transducers 132 are preferably operated in a bending mode and are driven by electrical drive signals.

To facilitate manufacture of preferred print head 101, ink jets 100 are formed of multiple laminated plates or sheets, such as of stainless steel, that are stacked in a superimposed relationship. All the plates are 0.2 millimeter (0.008 inch) thick unless otherwise specified, and are fabricated using relatively inexpensive photo-patterning and etching processes. Print head 101 is designed so that layer-to-layer alignment is not critical. That is, typical tolerances that can be held in a chemical etching process are adequate. The various plates forming print head 101 may be aligned and bonded in any suitable manner, including by the use of suitable mechanical fasteners. However, a preferred process for laminating and bonding the metal plates is described in U.S. Pat. No. 4,883,219 issued Nov. 28, 1989 for MANUFACTURE OF INK JET PRINT HEADS BY DIFFUSION BONDING AND BRAZING, which is assigned to the assignee of this application and incorporated herein by reference.

In the illustrated FIG. 2 embodiment of the present invention, the plates include a 0.1-millimeter (0.004-inch) thick diaphragm plate 136 that forms diaphragms 130 and portions of ink inlet ports 102; a body plate 138 that forms pressure chambers 122, portions of ink inlet ports 102, and provides a rigid backing for diaphragm plate 136; a separator plate 140 that forms pressure chamber ports 120, and portions of ink inlet ports 102 and outlet ports 124; a 0.1-millimeter (0.004-inch) thick inlet channel plate 142 that forms inlet channels 118, and portions of ink inlet ports 102 and outlet ports 124; a separator plate 144 that forms inlet ports 117 and portions of ink inlet ports 102 and outlet ports 124; a 0.05-millimeter (0.002-inch) thick filter plate 145 that forms filters 116 and portions of ink inlet ports 102 and outlet ports 124; six manifold plates 146A through 146F that form ink manifolds 106, ink feed channels 104, outlet channels 128, and the remaining portions of ink inlet ports 102; a 0.05-millimeter (0.002-inch) thick wall plate 148 that forms compliant walls 150 for respective ink manifolds 106; an orifice brace plate 152 that forms transition regions 154 between respective outlet channels 128 and orifices 108, and air chambers 156 behind respective compliant walls 150; and a 0.064 -millimeter (0.0025-inch) thick orifice plate 158 that forms orifices 108.

Table 1 shows preferred dimensions for the internal features of ink jets 100 that together provide each of ink jets 100 with a Helmholtz resonant frequency of about 24 kilohertz.

TABLE 1

All dimensions in millimeters

| Feature | Length | Width | Height | Cross-section |
|---|---|---|---|---|
| Ink manifold | 3.04 | 1.22 | 1.22 | Rectangular |
| Compliant wall | 3.04 | 1.22 | 0.05 | Rectangular |
| Inlet channel | 5.08 | 0.50 | 0.10 | Rectangular |
| Pressure chamber | — | 2.13 | 0.20 | Circular |
| Outlet port | 0.50 | 0.41 | — | Circular |
| Outlet channel | 1.27 | 0.89 | 0.50 | Oval |
| Transition region | 0.20 | 0.89 | 0.41 | Oval |
| Orifice | 0.06 | 0.06 | — | Circular |

To ensure jetting uniformity, all of ink jets 100 must operate substantially identically. This is achieved by constructing the ink jets such that all related features have substantially identical fluidic properties (i.e., inlet length and cross-sectional area, outlet length and cross-sectional area, and orifice size) and substantially identical transducer coupling efficiency (e.g., pressure chamber, diaphragm, and transducer dimensions).

The sizing ratio of inlet channels 118 to outlet channels 128 provides a corresponding impedance ratio that ensures a combination of high ink drop ejection efficiency and fast ink jet refill times. The sizing ratio depends on high aspect ratio cross-sections (0.1 millimeter thick by 0.5 millimeter wide) for inlet channels 118 and a large (0.71 millimeter effective diameter) for outlet channels 128 to minimize outlet fluidic inductance. The resistance of inlet channels 118 is dominated by their 0.1-millimeter thickness. Manufacturing tolerance errors generated when forming inlet channels 118 are minimized by their relatively large 0.5-millimeter width.

Ink drop ejection repetition rates approaching 20 kiloHertz are enabled by a high Helmholtz mode oscillation damping factor combined with a low refill time fluid resistance.

The overall design of ink jet 100 minimizes the length of inlet channels 118 and outlet channels 128 to maximize their standing wave frequencies, thereby minimizing any print quality artifacts typically experienced at high drop ejection repetition rates.

Figure 3:
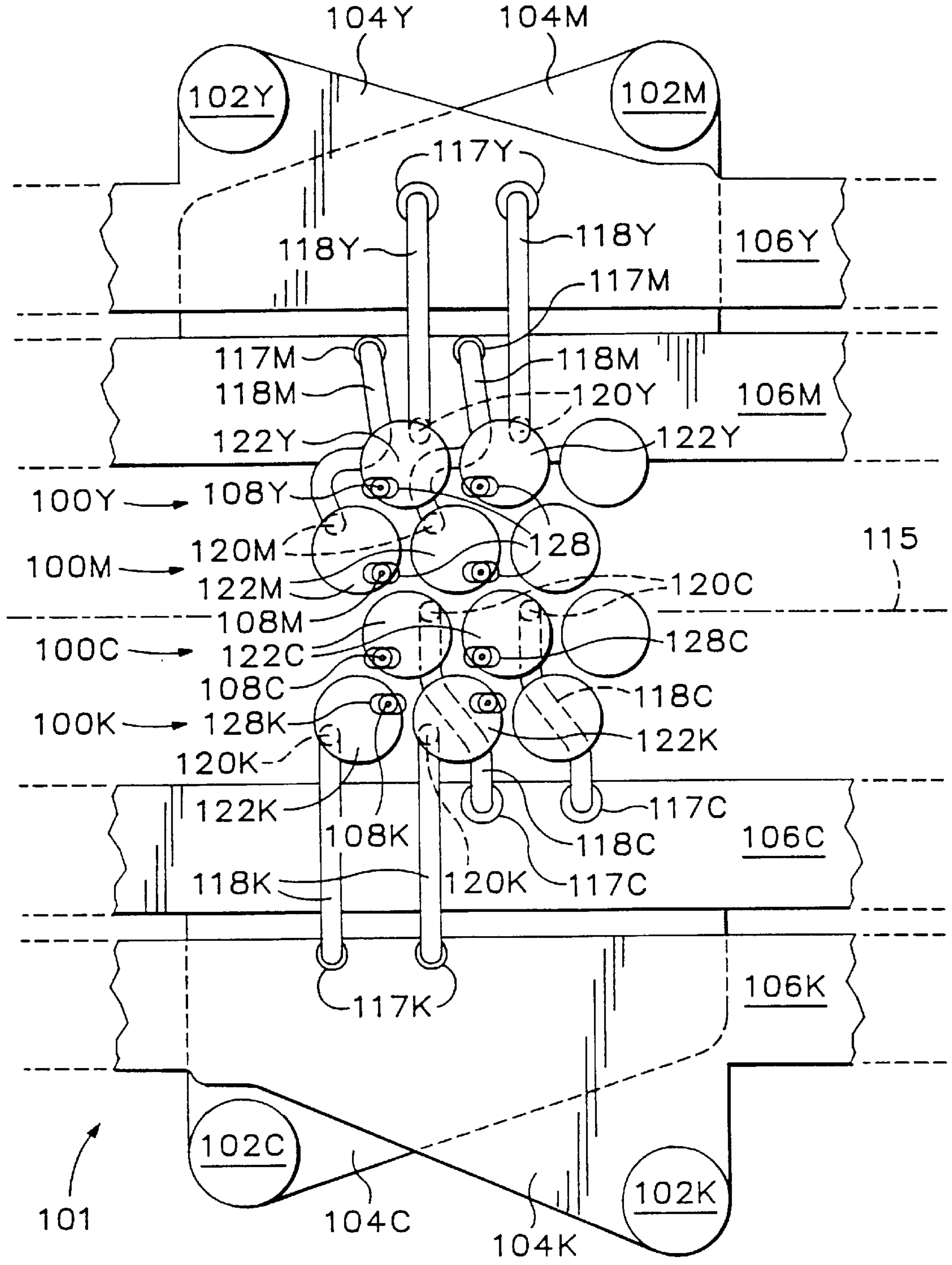
FIG. 3 is an enlarged diagrammatical plan view of a portion of the print head of FIG. 2 showing the relative spacial arrangement of the internal features of eight adjacent piezo-ceramic transducer-driven ink jets.

FIG. 3 is a plan view showing the relative spacial arrangement of the internal features in eight adjacent representative ink jets 100. The spacial arrangement can be understood by comparing similarly numbered features in FIGS. 2 and 3. For an ink jet printer employing this invention to print four pages per minute, each image must be jetted to image-receiving medium 114 (FIG. 2) in approximately 10 seconds. This requires 352 of ink jets 100 (88 ink jets per primary color) each ejecting ink drops at a repetition rate of approximately 11 kiloHertz. The 352 ink jets are arranged in four linear arrays spanning a width of 21.6 centimeters (8.5 inches), a width sufficient to span a standard sized 8.5- by 11-inch image-receiving medium. Of course, FIG. 3 shows only eight of the 352 ink jets in print head 101.

Orifices 108Y, 108M, and 108C are spaced apart vertically by 24 pixels, and orifices 108C and 108K are spaced apart vertically by 12 pixels. Orifices 108 in each array are all spaced apart horizontally by 28 pixels. Orifices 108Y, 108M, and 108C are vertically aligned, and black orifices 108K are offset horizontally therefrom by two pixels. A preferred pixel spacing is 0.085 millimeters (0.0033 inches), which supports a 12 dots per millimeter (300 dots per inch) printing resolution.

Print head 101 is preferably employed in an ink jet transfer printer in which ink drops are ejected from print head 101 and deposited on an image-receiving rotating drum positioned parallel to and a short distance away from the arrays of orifices 108. To deposit an image on the rotating drum, each of orifices 108 deposits a 12-dots-per-millimeter (300-dots-per-inch) column of pixels for each of 27 successive drum rotations. Print head 101 traverses two pixel positions laterally (parallel to the drum axis of rotation) for each drum rotation such that an interlaced image is deposited on the drum during the 27 drum rotations.

When printing a full color image with a preferred phase-change ink, secondary colors are formed by mixing two primary color ink drops before they freeze on the image-receiving medium. Therefore, primary color orifices 108Y, 108M, and 108C are vertically aligned so that a second ink drop will be deposited on top of a first ink drop before complete ink freezing has occurred. Conversely, black orifices 108K are horizontally offset to prevent mixing black ink with the colored inks.

As described above, high drop ejection rates depend on outlet channels 128 having a sufficiently large cross-sectional area to provide sufficient damping and low fluidic inductance. FIG. 3 shows that outlet channels 128 have an oval cross-section that provides additional dimensional clearance to other internal features of print head 101. Therefore, cross-sectionally oval outlet channels are preferred, although circular and other cross-sectional shapes would also function provided they have an equivalent cross-sectional area.

Figure 4:
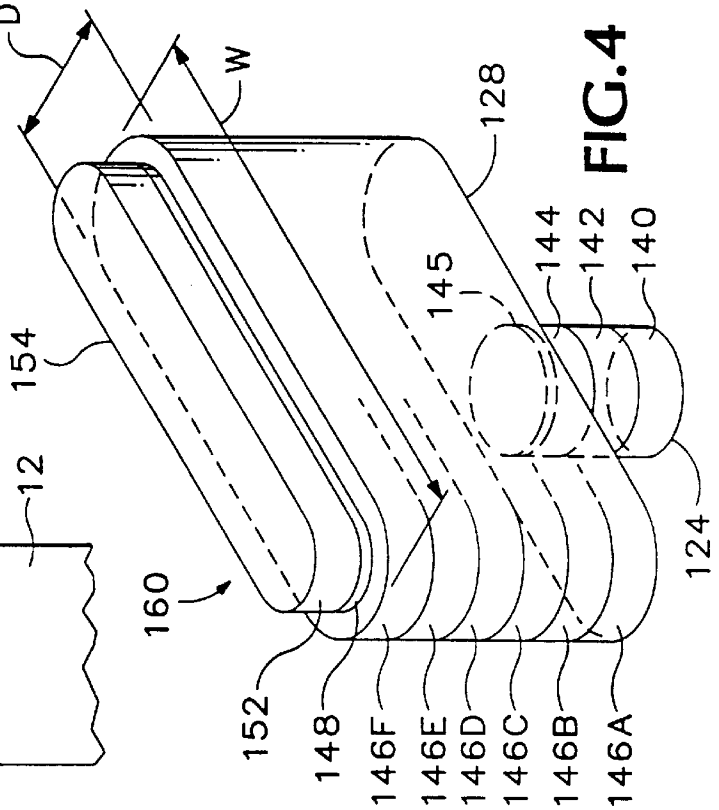
FIG. 4 is an enlarged oblique view of an oval outlet of this invention showing plate layer openings that form an outlet port portion, outlet channel portion, and a transition region portion thereof.

FIG. 4 shows additional spacial details of preferred plate layer openings that form outlet ports 124, outlet channels 128, and transition regions 154, which together form a representative oval outlet 160 of this invention.

Outlet ports 124 each have a circular cross-sectional shape formed in separator plate 140, inlet channel plate 142, separator plate 144, and filter plate 145. Outlet channels 128 each have an oval cross-sectional shape formed in manifold plates 146A through 146F. Transition regions 154 each have an oval cross-sectional shape formed in wall plate 148 and orifice brace plate 152. Preferred dimensions for oval outlet 160 are shown below in Table 2.

TABLE 2

L, W, D, and Dia. in millimeters; Area in $mm^2$

| FEATURE | L | W | D | AREA | EQUIV. DIA. |
|---|---|---|---|---|---|
| Outlet port | 0.56 | 0.41 | 0.41 | 0.13 | 0.41 |
| Outlet channel | 1.22 | 0.89 | 0.51 | 0.39 | 0.71 |
| Transition region | 0.25 | 0.89 | 0.41 | 0.32 | 0.64 |

FIGS. 5–19 show the plates that, when laminated together, form preferred print head 101 of this invention.

Figure 5:
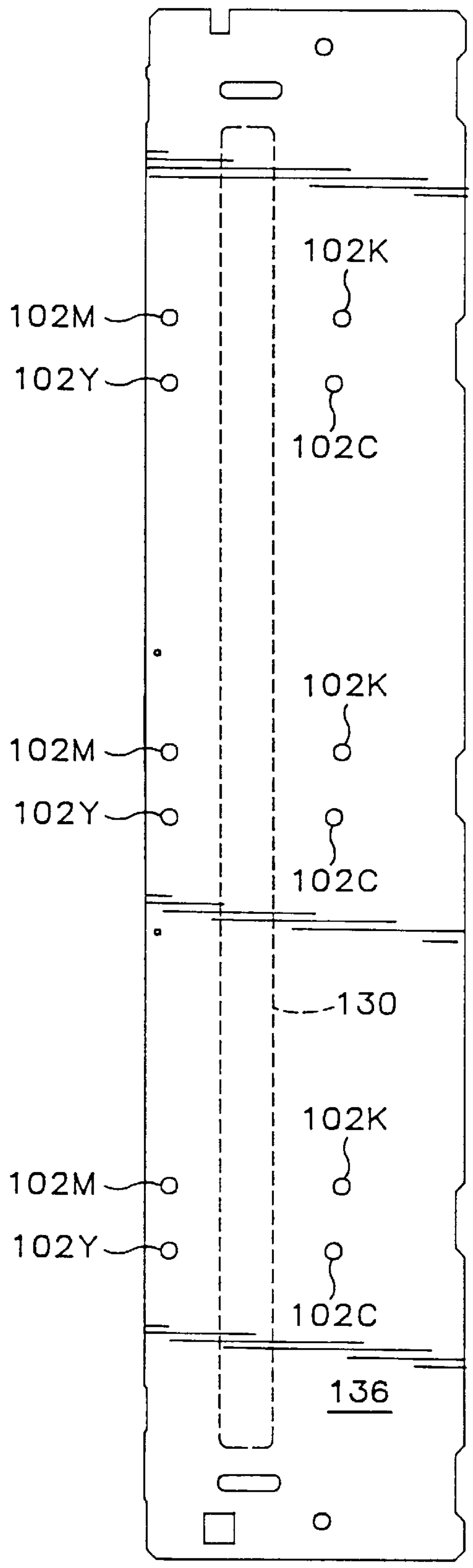
FIG. 5 is a plan view showing a preferred diaphragm plate of this invention.

In particular, FIG. 5 shows diaphragm plate 136, through which are openings for forming portions of ink inlet ports 102. Diaphragms 130 are inherently formed in the plate material in the region shown outlined in dashed lines.

Figure 6:
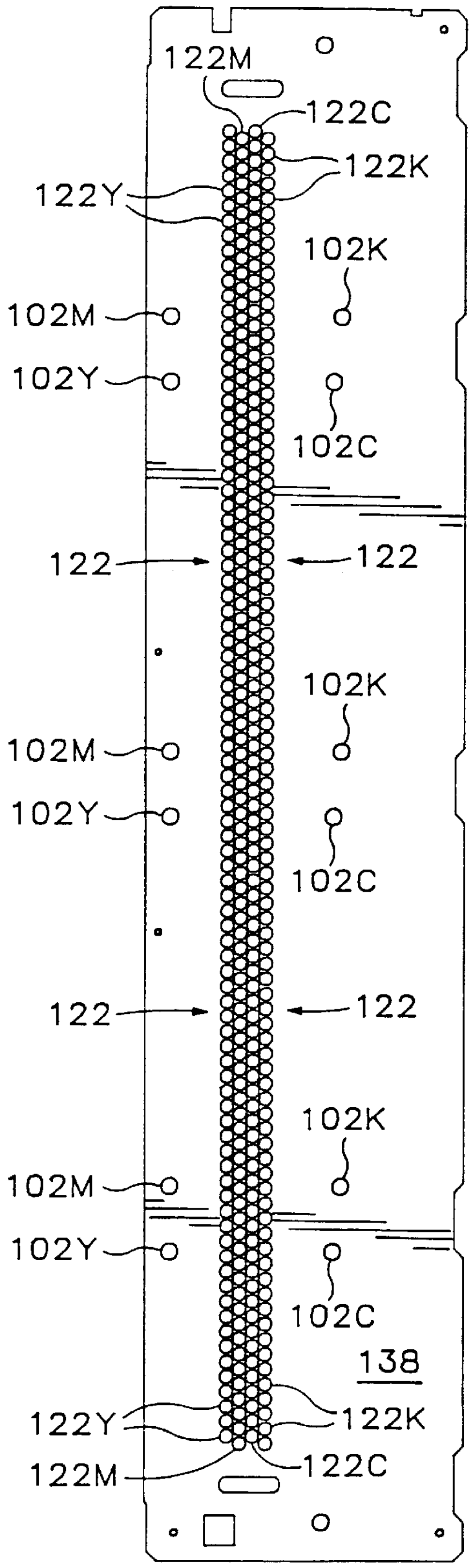
FIG. 6 is a plan view showing a preferred body plate of this invention.

FIG. 6 shows body plate 138, through which are openings for forming portions of ink inlet ports 102 and ink pressure chambers 122.

Figure 7:
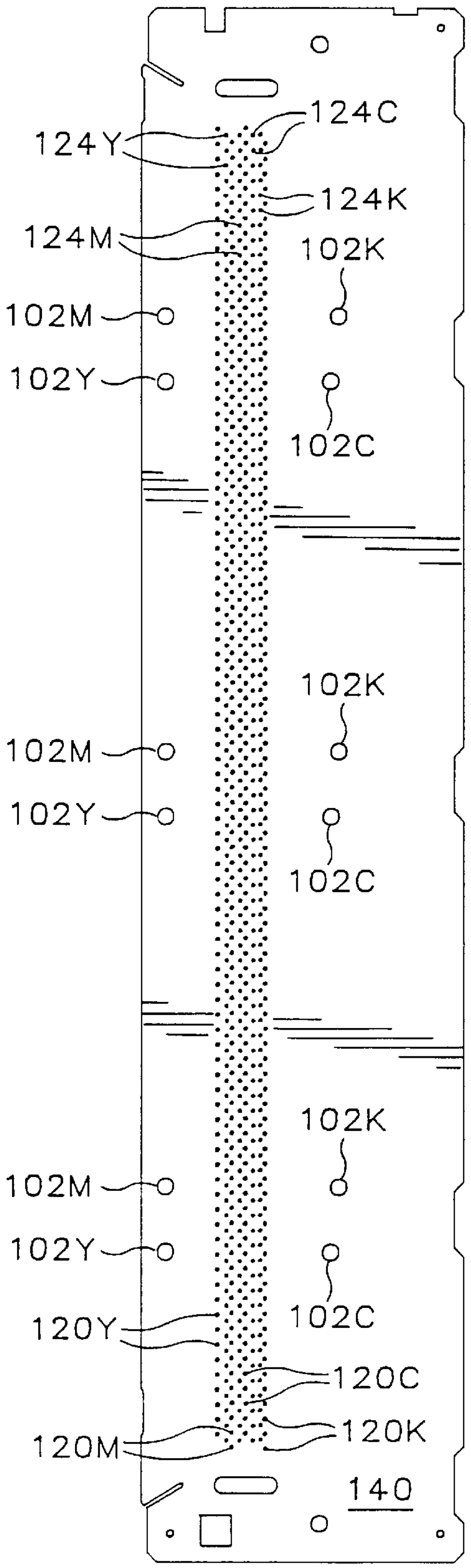
FIG. 7 is a plan view showing a preferred separator plate of this invention.

FIG. 7 shows separator plate 140, through which are openings for forming pressure chamber ports 120, portions of ink inlet ports 102, and portions of outlet ports 124.

Figure 8:
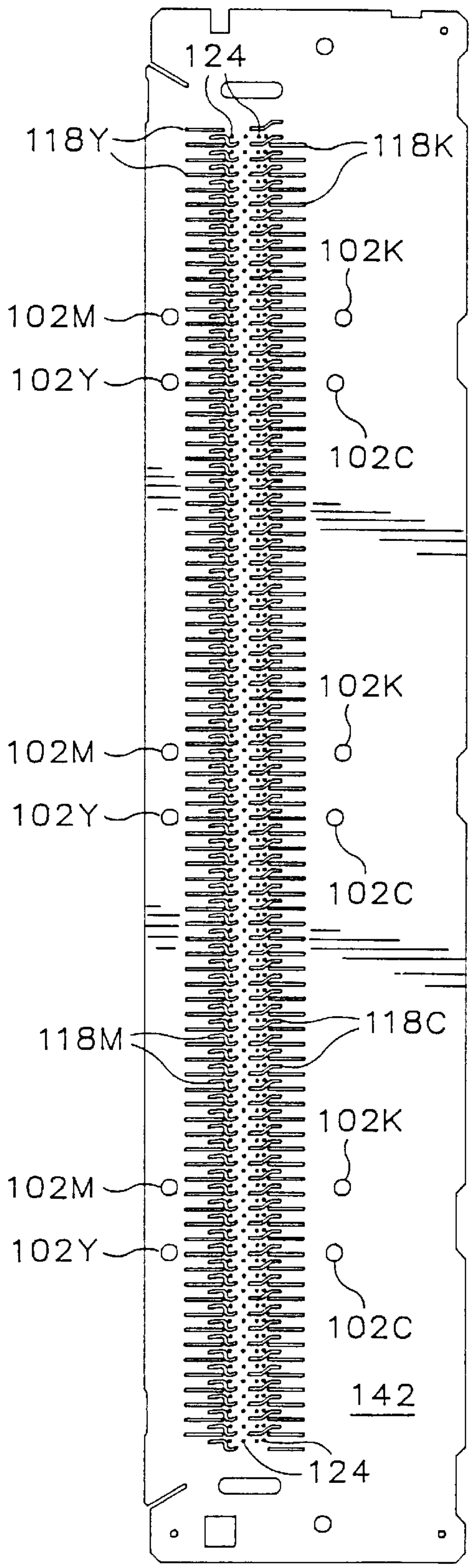
FIG. 8 is a plan view showing a preferred inlet channel plate of this invention.

FIG. 8 shows inlet channel plate 142, through which are openings for forming inlet channels 118, portions of ink inlet ports 102, and portions of outlet ports 124.

Figure 9:
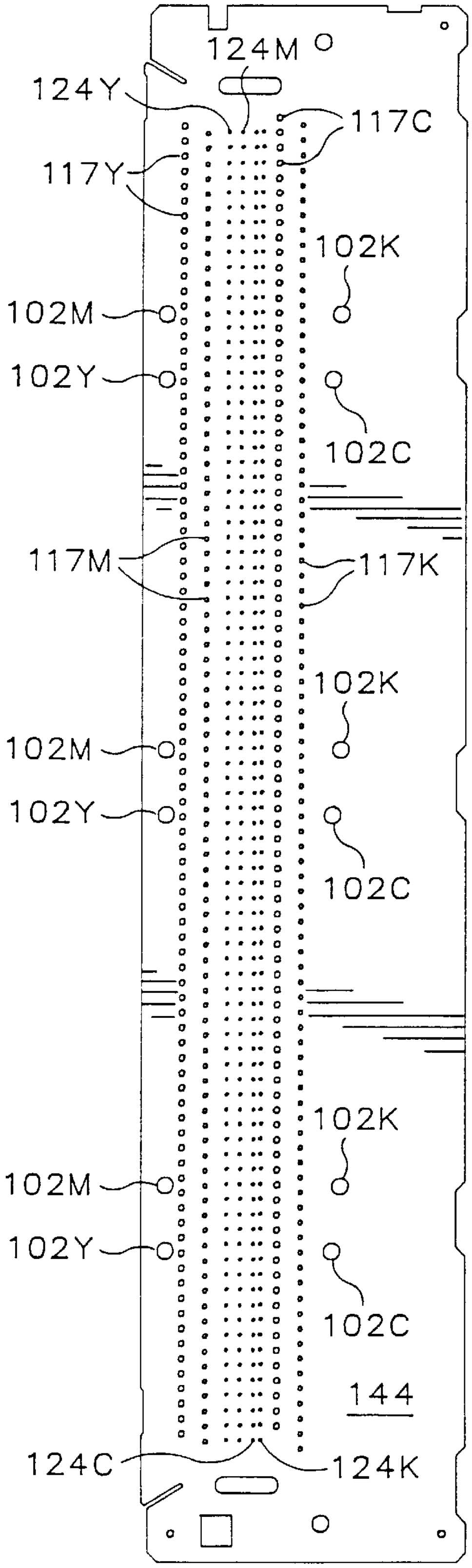
FIG. 9 is a plan view showing a preferred separator plate of this invention.

FIG. 9 shows separator plate 144, through which are openings for forming inlet ports 117, portions of ink inlet ports 102, and portions of outlet ports 124.

Figure 10:
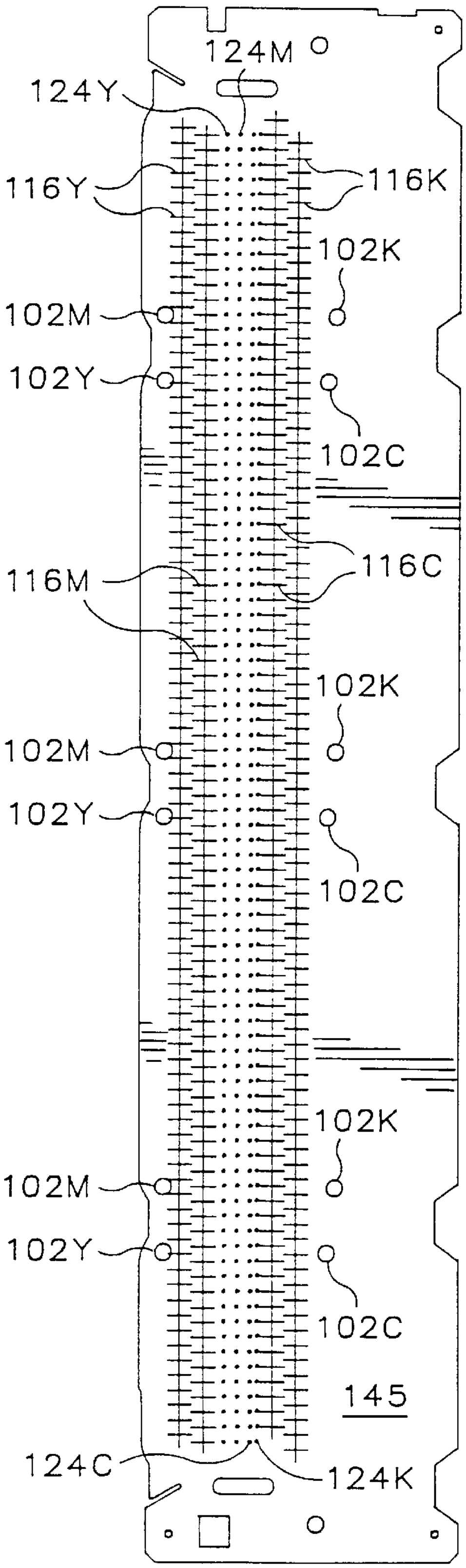
FIG. 10 is a plan view showing a preferred filter plate of this invention.

FIG. 10 shows filter plate 145, through which are openings for forming inlet filters 116, portions of ink inlet ports 102, and portions of outlet ports 124.

Figure 11:
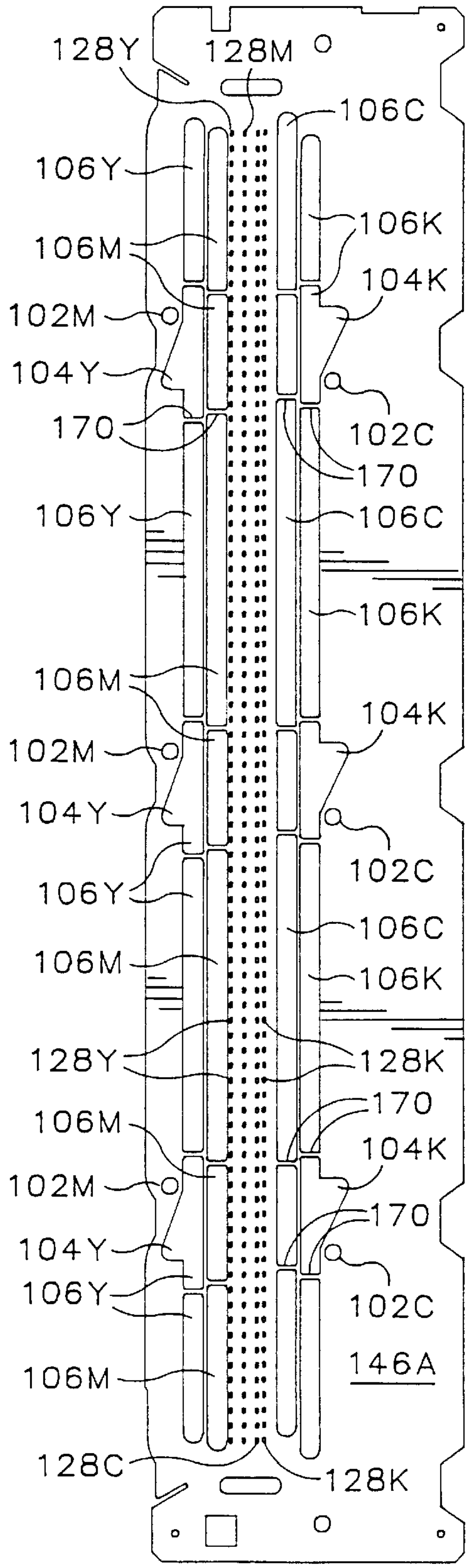
FIGS. 11–16 are plan views showing a set of preferred manifold plates of this invention.

FIG. 11 shows manifold plate 146A, through which are openings for forming portions of ink feed channels 104, portions of manifolds 106, portions of ink inlet ports 102, and portions of oval outlet channels 128. Manifolds 106 extend the entire length of ink jet arrays 100, but are reinforced in each of manifold plates 146 by support ribs 170. Support ribs 170 are purposely not superimposed in each of manifold plates 146 to prevent the formation of an ink flow blockage in each of manifolds 106.

Figure 12:
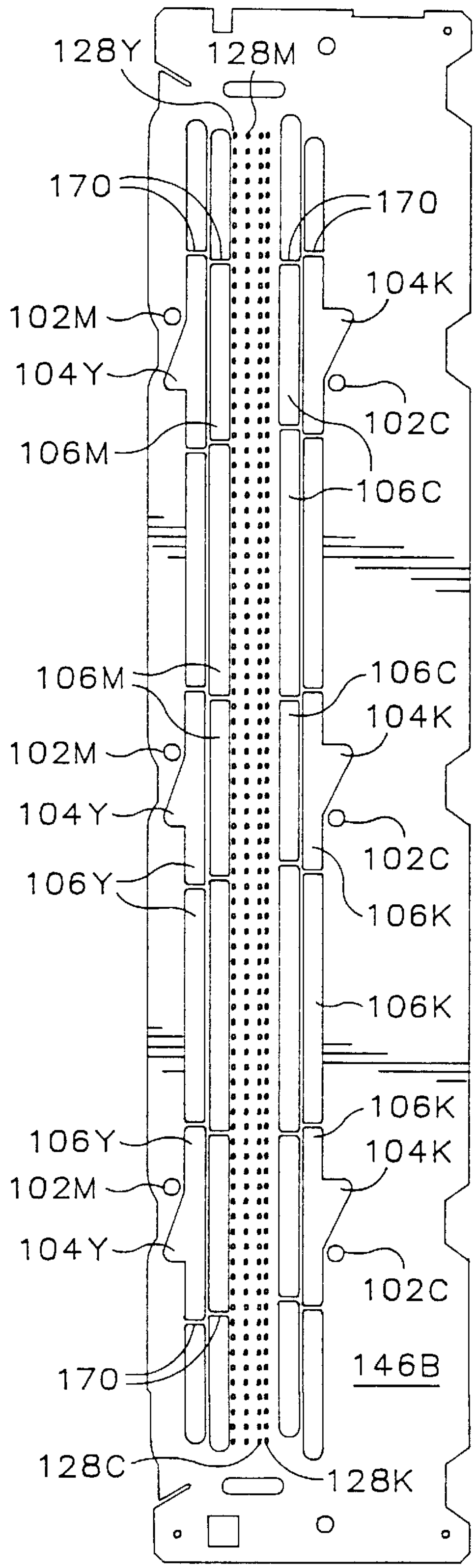

FIG. 12 shows manifold plate 146B, through which are openings for forming portions of ink feed channels 104, portions of manifolds 106, portions of ink inlet ports 102, and portions of oval outlet channels 128.

Figure 13:
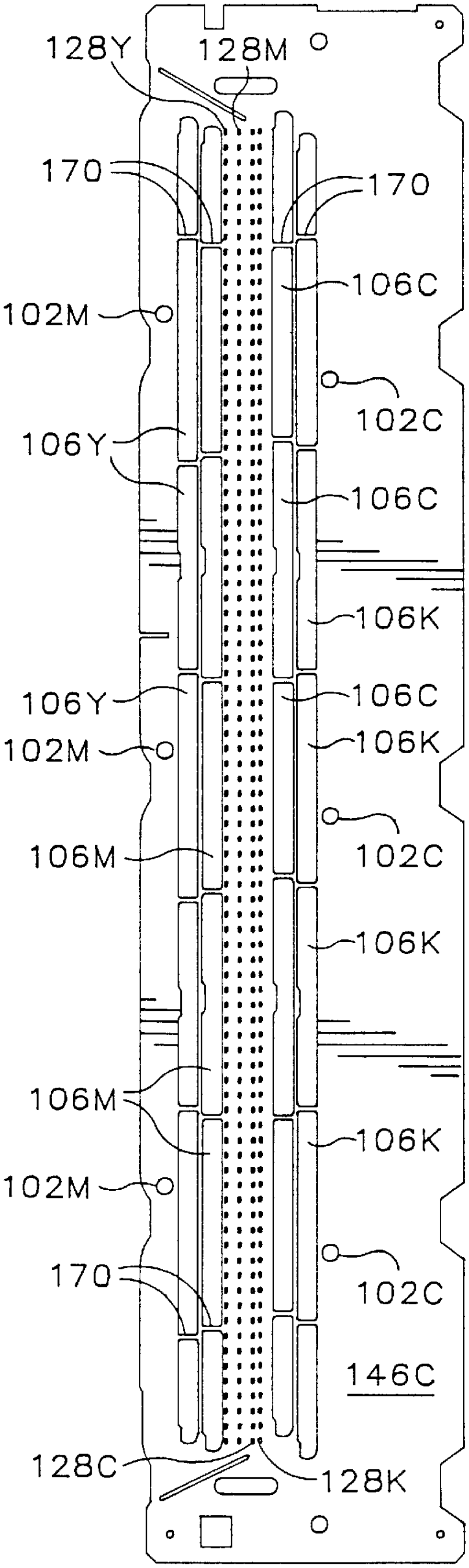

FIG. 13 shows manifold plate 146C, through which are openings for forming portions of manifolds 106, portions of ink inlet ports 102, and portions of oval outlet channels 128.

Figure 14:
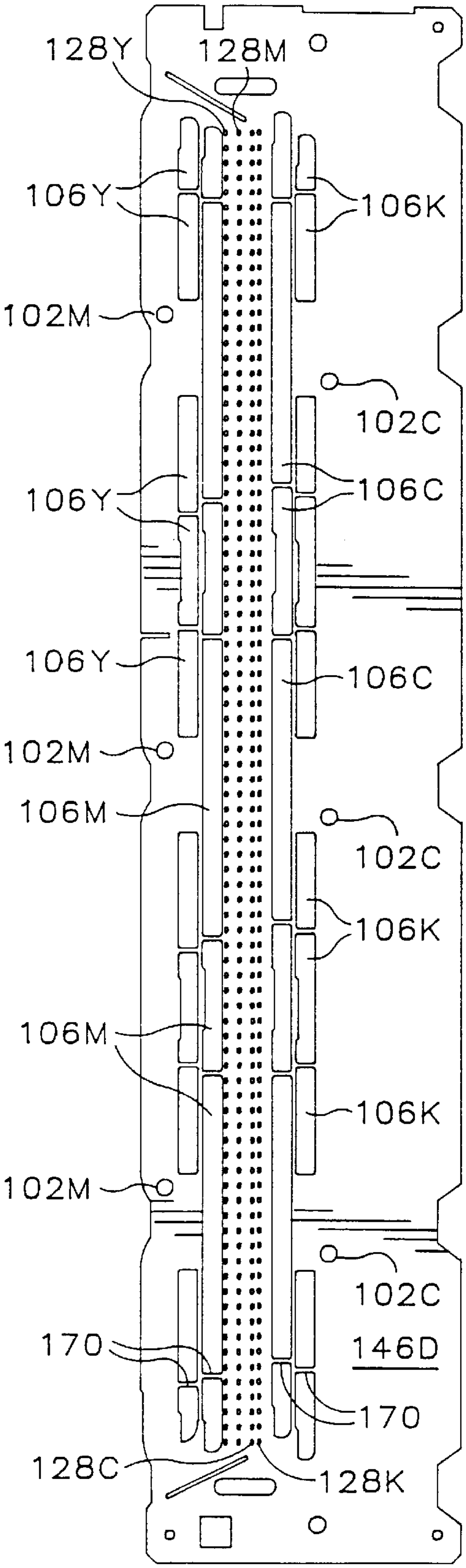

FIG. 14 shows manifold plate 146D, through which are openings for forming portions of manifolds 106, portions of ink inlet ports 102, and portions of oval outlet channels 128.

Figure 15:
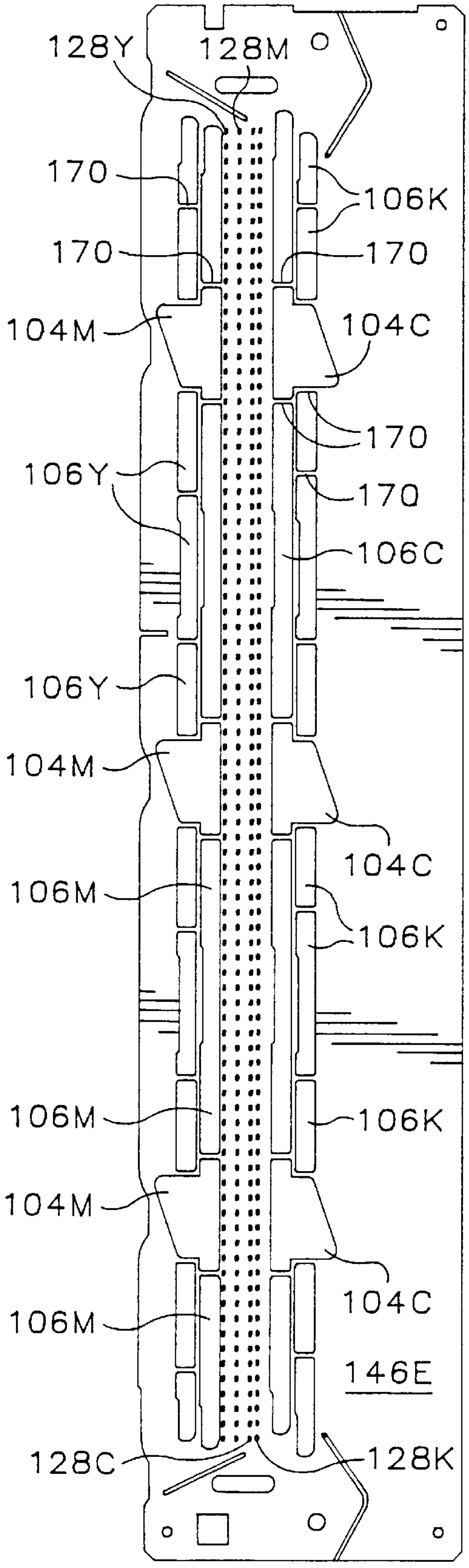

FIG. 15 shows manifold plate 146E, through which are openings for forming portions of manifolds 106, portions of ink feed channels 104, and portions of oval outlet channels 128.

Figure 16:
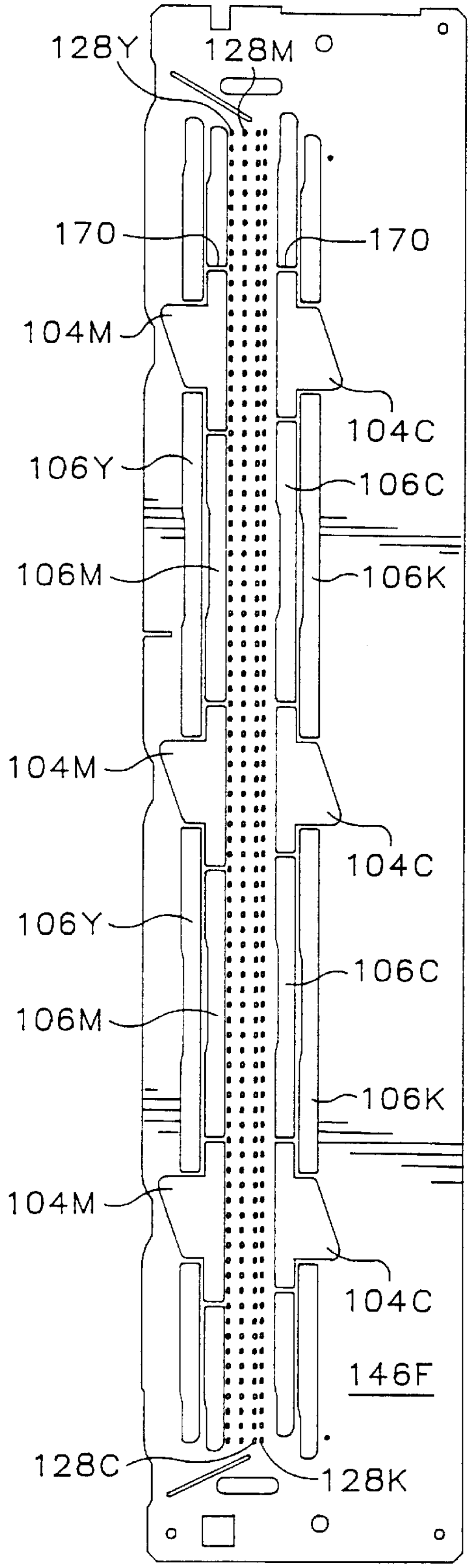

FIG. 16 shows manifold plate 146F, through which are openings for forming portions of manifolds 106, portions of ink feed channels 104, and portions of oval outlet channels 128.

Figure 17:
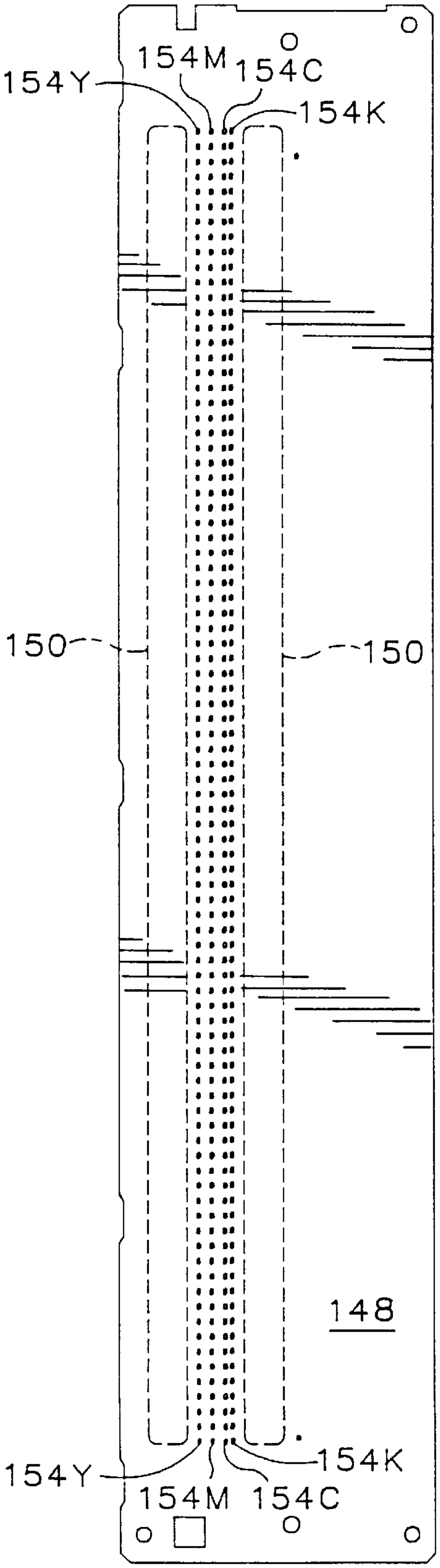
FIG. 17 is a plan view showing a preferred wall plate of this invention.

FIG. 17 shows wall plate 148, through which are openings for forming portions of transition regions 154. Compliant walls 150 are inherently formed in the plate material in the regions shown outlined in dashed lines.

Figure 18:
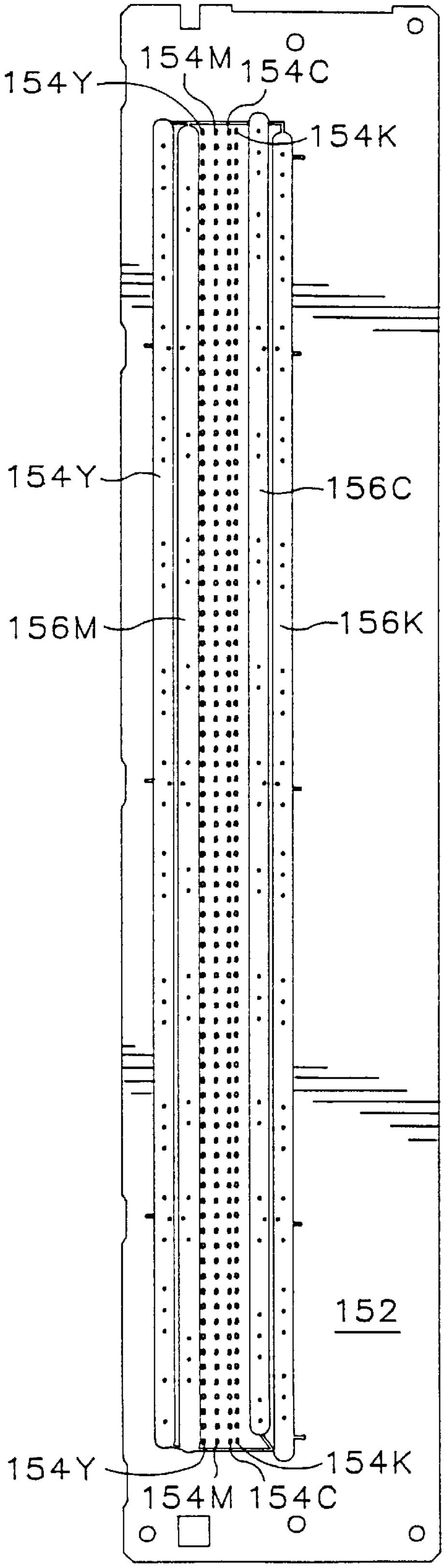
FIG. 18 is a plan view showing a preferred orifice brace plate of this invention.

FIG. 18 shows orifice brace plate 152, through which are openings for forming portions of transition regions 154. Air chambers 156 are formed by "half-etching" the 0.2-millimeter (0.008-inch) thick plate material to a depth in a range from about 0.05 millimeter (0.002 inch) to about 0.1 millimeter (0.004 inch).

Figure 19:
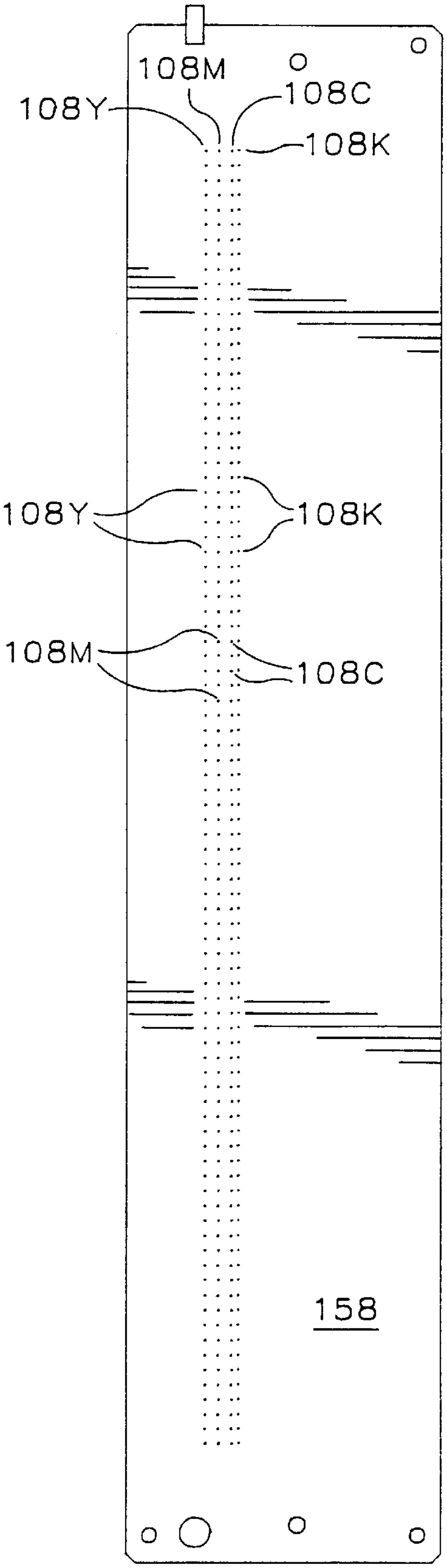
FIG. 19 is a plan view showing a preferred orifice plate of this invention.

FIG. 19 shows orifice plate 158, through which are punched 0.06-millimeter (0.0025-inch) openings for forming orifices 108.

As described above with reference to FIG. 2, jetting performance is enhanced by minimizing the length of inlet channels 118 and outlet channels 128. However, minimizing the inlet and outlet lengths also limits the volume and performance of manifolds 106, which leads to relatively large ink pressure fluctuations when substantial numbers of ink jets 100 are ejecting ink drops simultaneously. Unfortunately, the pressure fluctuations cause cross-talk among ink jets 100 that results in jetting nonuniformity and poor print quality.

To minimize pressure fluctuations in manifolds 106, compliant walls 150 form one wall along the entire length of manifolds 106. The mechanical compliance of walls 150 absorbs the ink pressure fluctuations during the "start-up" of jet firing and until a steady ink flow is established. An electrical analogy to compliant walls 150 is a filter capacitor in a power supply.

Referring to FIGS. 11–16, ink supply performance of manifolds 106 is further enhanced by providing three of ink feed channels 104 per manifold to reduce the fluidic inductance (resistance to ink flow) within manifolds 106. Providing three ink feed channels 104 per manifold 106 is electrically analogous to placing three resistors in parallel. That is, the effective manifold length is one-sixth the actual manifold length and the manifold inductance is reduced accordingly.

Figure 20:
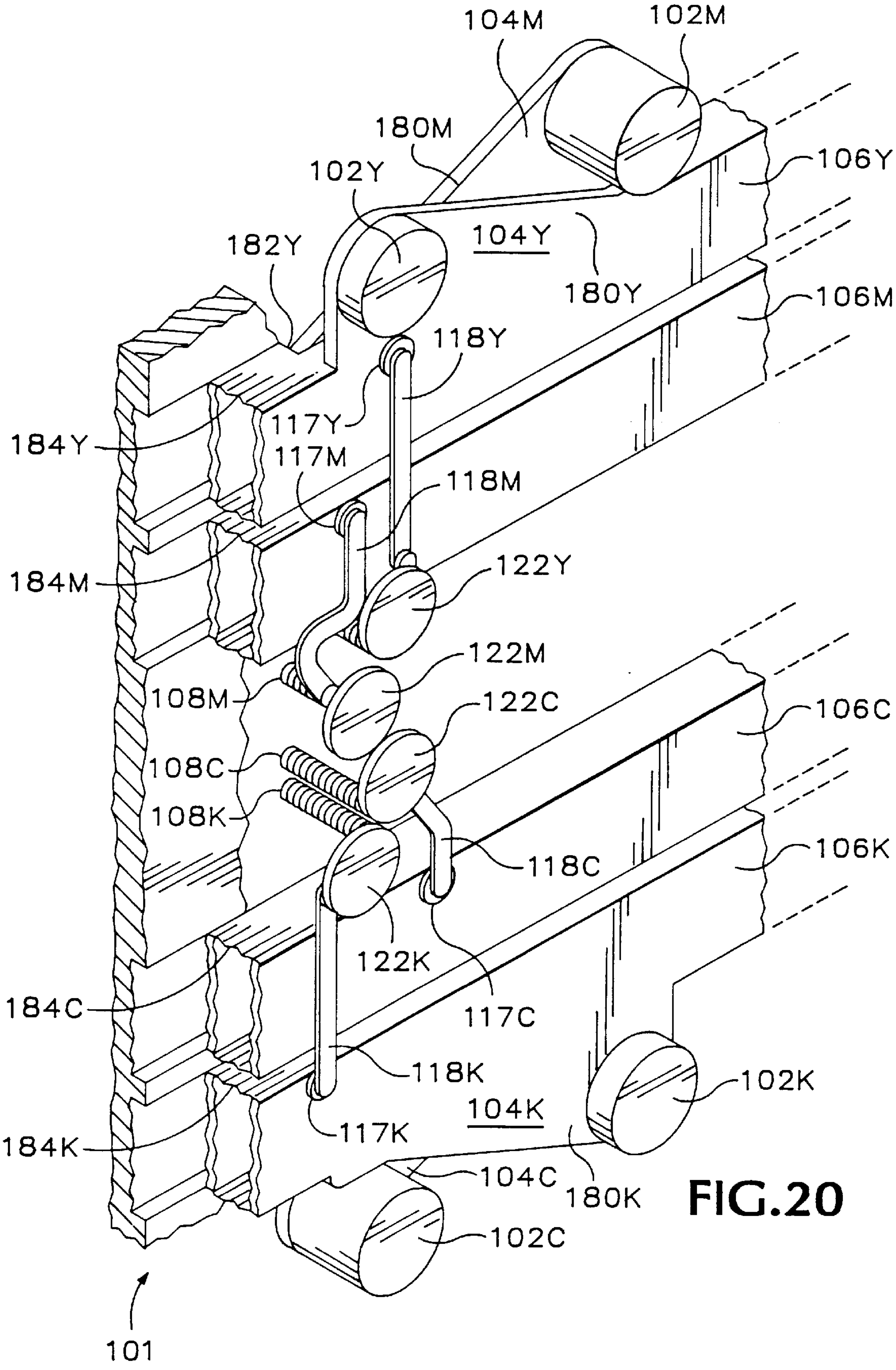
FIG. 20 is an enlarged diagrammatical isometric view of four adjacent ink jets of this invention shown partly cut away to reveal ink feed and ink manifold design details.

Referring to FIG. 20, ink flow performance of manifolds 106 is further improved by providing ink feed channels 104 with a low inductance design. This entails keeping ink inlet ports 102 as cross-sectionally large and as close to manifolds 106 as possible. The cross-sectionally large area is implemented by shaping ink feed channels 104 to flare open in tapered sections 180 between ink inlet ports 102 and manifolds 106.

Supplying ink from ink inlet ports 102M and 102C to inner manifolds 106M and 106C requires ink feed channels 104M and 104Y and ink feed channels 104C and 104K to "cross-over" each other as shown in FIG. 20. Necked down portions 182Y and 182K (not shown) of manifolds 106Y and 106K provide clearance for the cross-over sections of respective ink feed channels 104M and 104C. FIGS. 15 and 16 provide another view of the ink feed channel cross-overs.

The relatively large cross-sectional area of ink feed channels 104 results in a relatively large ink feed volume that causes potential air purging problems for print head 101. Purging has a general goal of removing entrapped air from ink jets 100 by causing a minimum possible amount of ink to rapidly flow through all the internal features of print head 101. Purgeability problems are generally caused by air bubble buoyancy and ink flow stagnation regions within print head 101.

Air bubble buoyancy is used to enhance purgeability of ink jets 100 as follows. Ink flows from ink inlet ports 102, through ink feed channels 104, and into manifolds 106. Any air bubbles are held by buoyancy against elevationally upper walls 184 of manifolds 106. Therefore, inlet ports 117 to inlet channels 118 are positioned adjacent to upper walls 184 to extract ink from the tops of manifolds 106 so that a minimum of ink flow is required to draw air bubbles into inlet channels 118. Once air bubbles have entered inlet channels 118, efficient purging is ensured through the remaining internal features leading to orifices 108 by a combination of feature smoothness, small cross-sectional area, and diametrical flow across circular pressure chambers 122.

Figure 21:
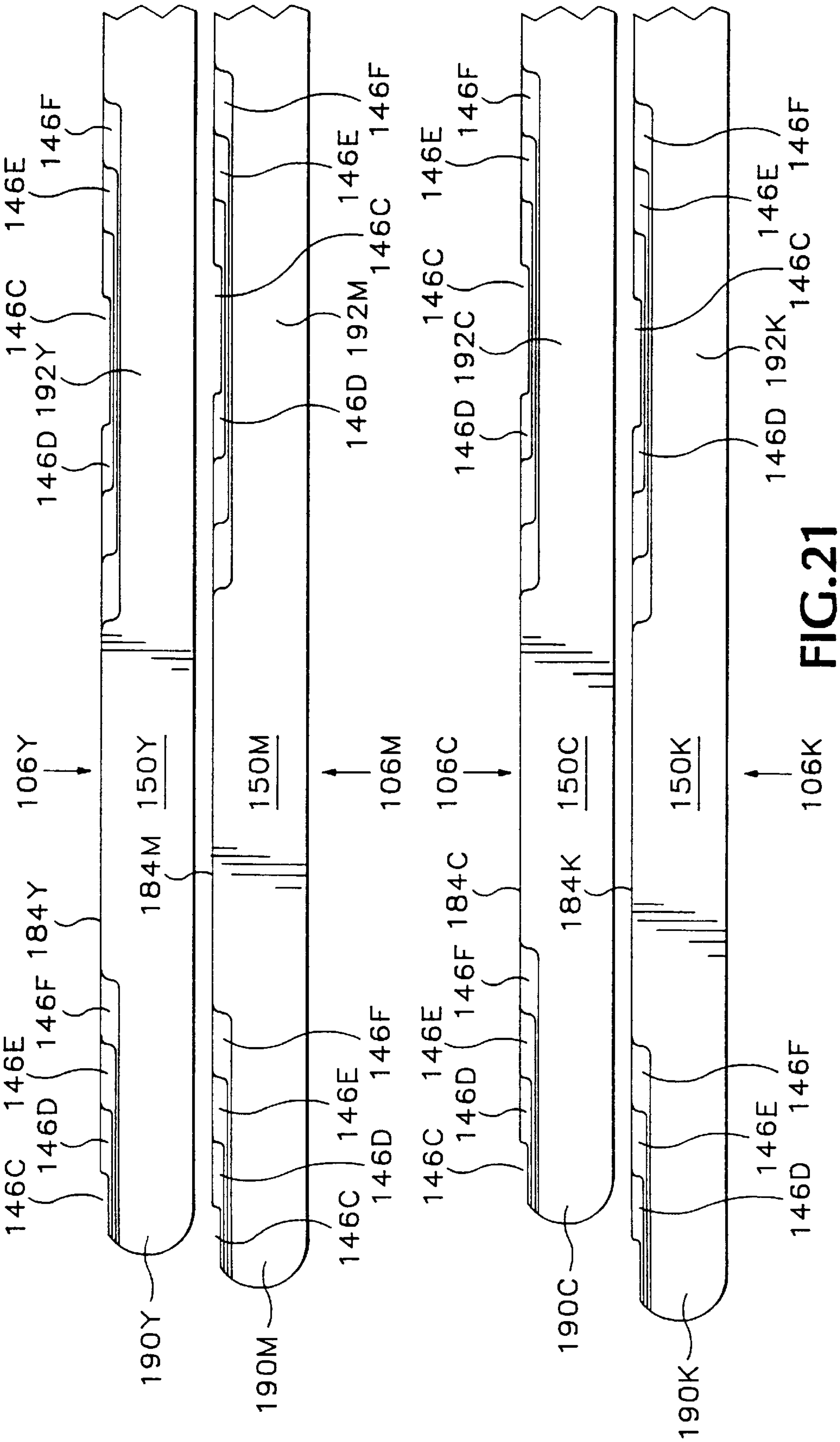
FIG. 21 is an enlarged diagrammatical plan view of portions of manifolds of this invention showing a plate-stacking arrangement employed to provide cross-sectionally tapered manifold sections.

Ink flow stagnation is a potential problem in areas of low ink flow rate within manifolds 106. Referring to FIG. 21, ink flow stagnation is most likely to occur in manifolds 106 at points downstream from ink feed channels 104 where relatively few inlet ports 117 are causing ink flow. In manifolds 106 of this invention, stagnation points are most likely to occur at ends 190 and symmetry midpoints 192 between ink feed channels 104. To prevent ink flow stagnation, manifolds 106 are partially tapered adjacent to upper walls 184 in the regions of ends 190 and symmetry midpoints 192. The tapering causes an elevationally upward slope in a direction from compliant wall 150 toward inlet ports 117 (not shown). Accordingly, the elevationally upward slope directs ink flow and air bubbles toward inlet ports 117 to enhance purging.

Referring also to FIGS. 14–16, the tapered regions are preferably implemented by progressively increasing the manifold opening size in respective manifold plates 146F to 146C in the regions adjacent to ends 190 and symmetry midpoints 192.

Figure 22:
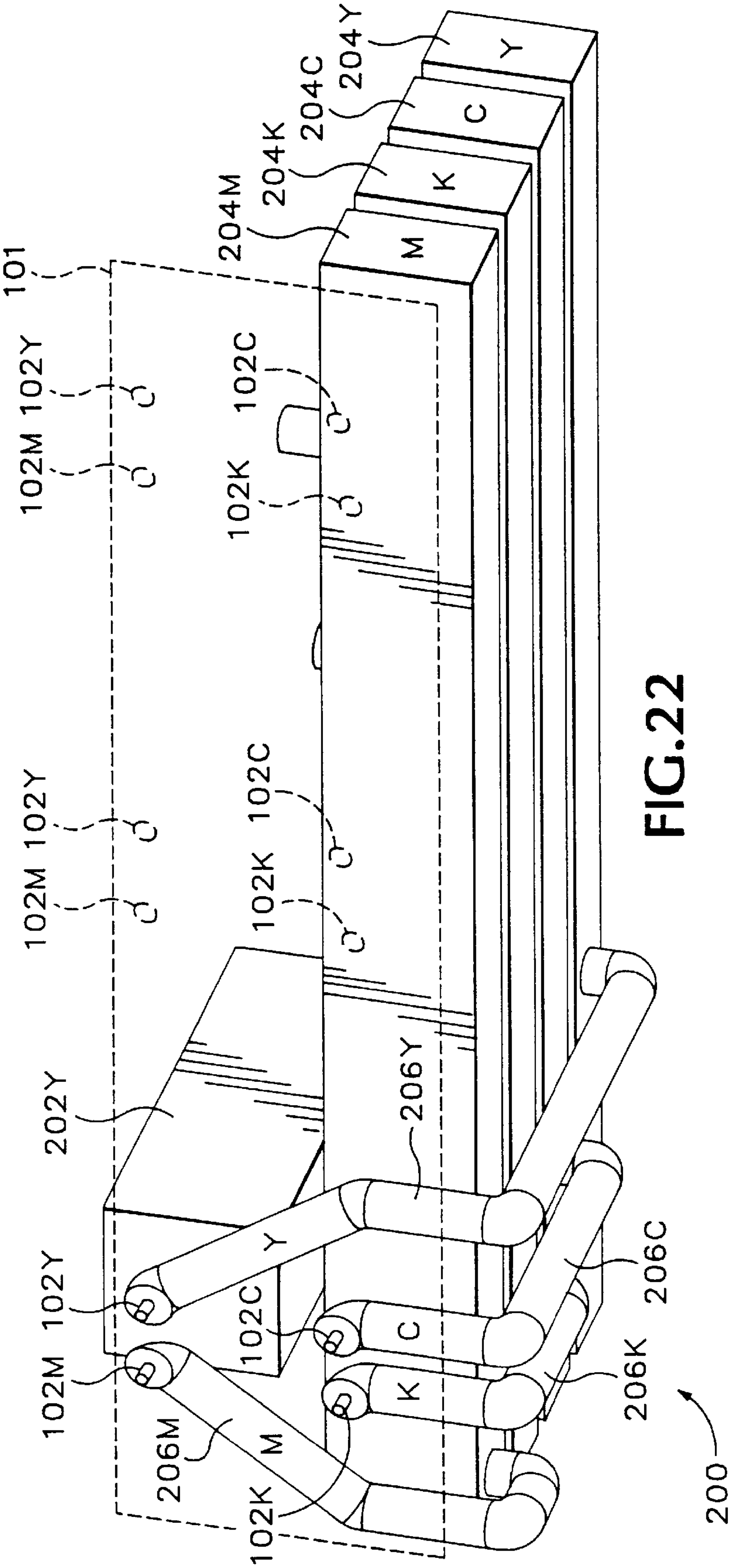
FIG. 22 is a diagrammatical isometric view of an ink feed system of this invention showing an ink catch basin, supply manifolds, and ink stack feeds.

FIG. 22 shows an ink feed system 200 of this invention for supplying four colors of ink to ink inlet ports 102 of print head 101 (shown positionally in dashed lines). Phase-change inks are melted and deposited posited in ink catch basins 202 (one of four shown) from which the melted ink is funneled into heated ink storage reservoirs 204. As print head 101 uses ink, it is resupplied from ink storage reservoirs 204 by flowing through elevationally upward sloping ink stack feeds 206 to ink inlet ports 102. There are three sets of ink stack feeds 206, only one set of which is shown. The elevationally upward slope of ink stack feeds 206 enhances purgeability of ink feed system 200 and print head 101 by advantageously using bubble buoyancy as described above.

Figure 23:
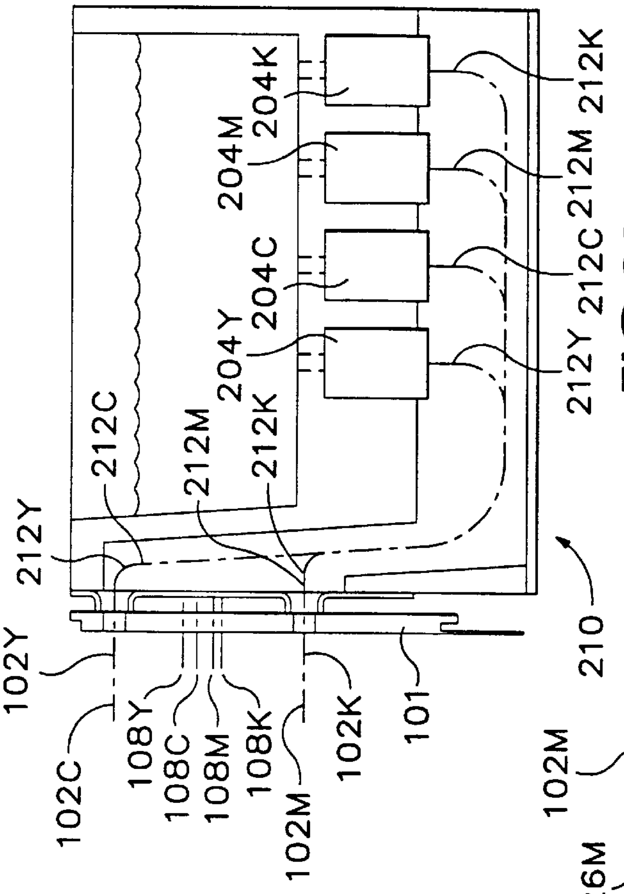
FIG. 23 is a schematic side pictorial view of ink catch basins supplying ink through ink feed pathways to ink inlet ports of an ink jet array print head of this invention.

FIG. 23 shows an advantageous rearrangement of ink feed system 200 in which an improved ink feed system 210 changes the ordering of ink colors stored by ink storage reservoirs 204 to yellow, cyan, magenta, and black, ordered from closest to most distant from print head 101. The rearrangement corresponds to the ordering of the ink feeds and orifice arrays 108 in the print head 101 from top to bottom. Finally, the rearrangement includes interconnecting ink stack feeds 206 such that yellow and cyan ink flows to upper ink inlet ports 102Y and 102C, and magenta and black ink flows to lower ink inlet ports 102M and 102K.

This rearrangement beneficially provides sets of ink stack feeds 206 that have substantially equal length pathways 212 between a particular ink supply reservoir 204 and its associated ink inlet port 102 on print head 101. In improved ink feed system 210, ink pathways 212 are represented by dot-dashed lines. The color arrangement of improved ink feed system 210 provides yellow pathway 212Y with a 78.7-millimeter (3.1-inch) length, cyan pathway 212C with a 91.4-millimeter (3.6-inch) length, magenta pathway 212M with a 81.3-millimeter (3.2-inch) length, and black pathway 212K with a 94-millimeter (3.7-inch) length. The plus-and-minus 7.6-millimeter (0.3-inch) pathway length variation is not a substantial variation with respect to practicing this invention.

Of course, the rearrangements apply to each of the three sets of stack feeds employed by improved ink feed system 210, and other ink color arrangements may be employed, provided they each result in substantially equal stack feed lengths.

Figure 24:
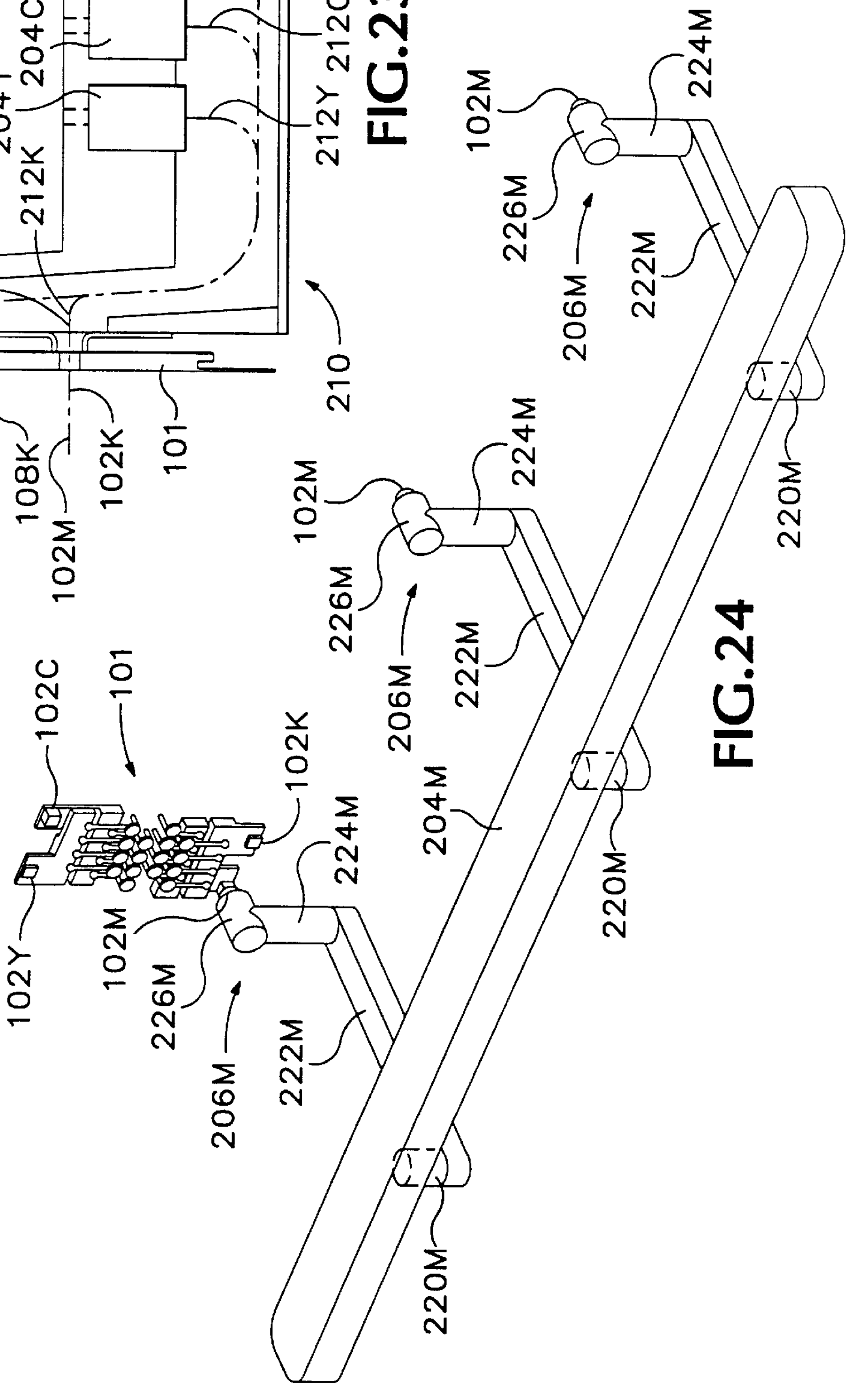
FIG. 24 is a isometric pictorial view showing a preferred arrangement of a magenta ink feed system and a portion of the ink jet array print head of this invention.

FIG. 24 reveals the arrangement of components forming magenta pathway 212M, which is representative of the other pathways 212. A 16-channel portion of print head 101 is shown for clarity including upper ink inlet ports 102Y and 102C and lower ink inlet ports 102M and 102K. Magenta ink supply manifold 204M spans substantially the entire width of print head 101, the full width of which is not shown. Three magenta ink stack feeds 206M are shown, only a representative one of which will be described. A port 220M connects ink supply manifold 204M to a horizontal stack segment 222M, which leads to a vertical stack segment 224M that terminates in a print head interface port 226M. Print head interface ports 226 are mated to and pressed against ink inlet ports 102 of diaphragm plate 136 (FIG. 5) forming part of print head 101. Of course, the ink colors conveyed by ink inlet ports 102 have been rearranged as described above.

In sizing ink stack feeds 206, the same purgeability versus fluidic inductance tradeoff exists as exists for ink feed channels 104 (FIG. 20) in print head 101. Namely, a large cross-sectional area of ink stack feeds 206 results in a potentially excessive ink feed volume and potential air purging problems. On the other hand, a small cross-sectional area results in high fluidic inductance and resistance which cause fluctuations in ink feed channel pressure during jet start-up and steady state pressure loss. The effects of ink feed start-up are especially troublesome when a large number of orifices are simultaneously ejecting ink. It is, therefore, desirable to make the cross-sectional area of ink stack feeds 206 as small as possible without causing noticeable start-up problems.

Determining the required cross-sectional area of ink stack feeds 206 entails first calculating the ink drop mass enclosed by any one of orifices 108. As shown in Table 1, 0.06-millimeter diameter orifices 108 are formed in a 0.06-millimeter thick plate. The enclosed ink drop mass is, therefore, 0.83 nanograms. When all orifices 108M except one (87 orifices) are simultaneously ejecting ink, 72 nanograms (0.83 nanograms times 87 orifices) of magenta ink mass is suddenly drawn through stack feeds 222M. Under these conditions, the ink meniscus displacement in the single nonejecting orifice must be substantially less than one orifice volume. This objective is achieved by providing ink stack feeds 206 with a preferred cross-sectional area of about 0.35 square centimeters (0.0542 square inches). Most preferably, each of horizontal stack segments 222 has a 6.35-millimeter (0.25-inch) width and a 5.49-millimeter (0.216-inch) height.

The benefits of substantially equal lengths for ink stack feeds 206 are similar to the benefits for substantially equal channel lengths within print head 101. Namely, ink drop ejection volumes and velocities are equalized and cross-talk induced jetting nonuniformities are minimized.

Figure 25:
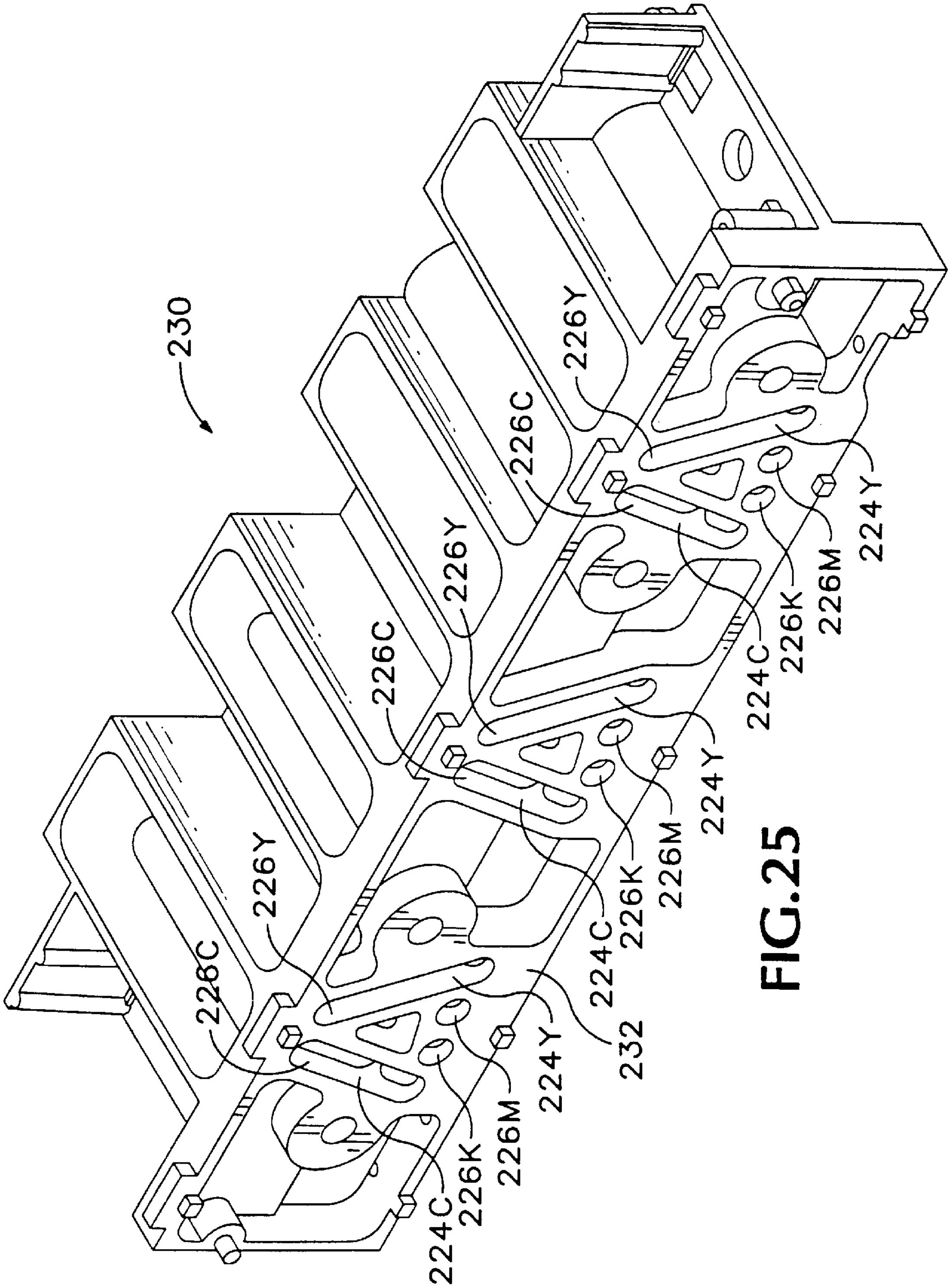
FIG. 25 is an isometric front pictorial view of a catch basin casting showing channels forming portions of the ink stack feeds of this invention.
Figure 26:
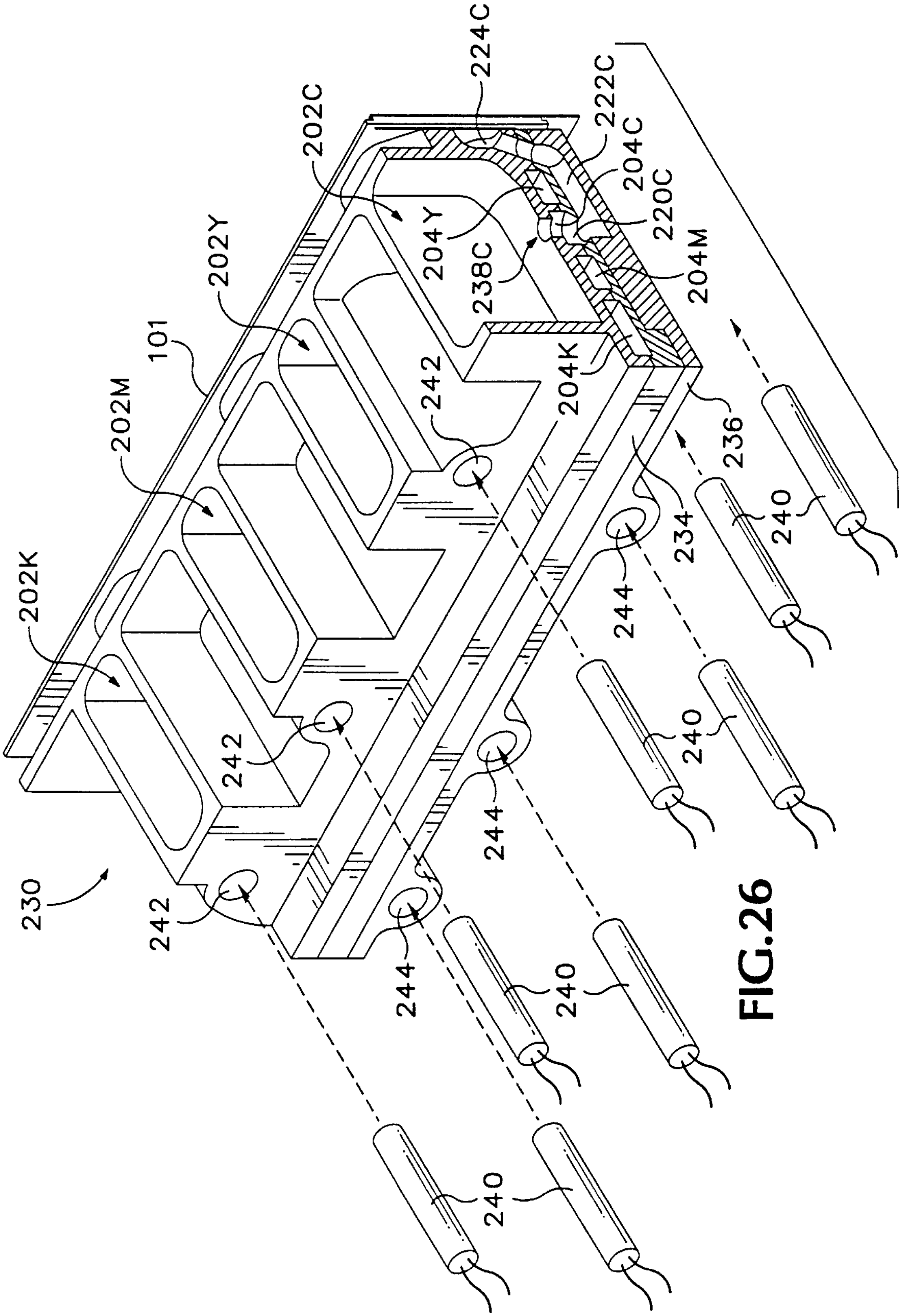
FIG. 26 is an isometric rear pictorial view of the catch basin casting of FIG. 25 mated with ink storage reservoir and ink stack feed forming castings that are cross-sectionally cut away to reveal representative portions of the ink storage reservoirs and an ink stack feed, and exploded to reveal the locations and orientations of cartridge heaters employed to melt phase-change ink conveyed from the ink catch basins, through the ink stack feeds, to the ink jet array print head.

FIGS. 25 and 26 show a preferred implementation of ink feed system 210. In particular, FIG. 25 shows a catch basin casting 230 that includes a frontal surface 232 that mates with print head 101 (not shown). Frontal surface 232 includes channels, which when enclosed by print head 101, form print head interface ports 226 and vertical stack segments 224C and 224Y of ink stack feeds 206.

FIG. 26 shows a rear view of catch basin casting 230 mated with an ink storage reservoir plate 234 and an ink stack feed forming body 236. FIG. 26 is cross-sectionally cut away to reveal portions of ink catch basin 202C, a catch basin opening 238C, ink storage reservoirs 204, port 220C, horizontal stack segment 222C, and vertical stack segment 224C. Catch basin opening 238C is representative of other catch basin openings (not shown) that allow ink to flow from ink catch basins 202 into an associated ink supply reservoir 204.

FIG. 26 is also exploded to reveal the locations and orientations of cartridge heaters 240 employed to melt phase-change ink conveyed from ink catch basins 202, through ink stack feeds 206, to print head 101. Four cartridge heaters 240 are inserted in holes 242 (only three are shown) formed in catch basin casting 230 and four cartridge heaters 240 are inserted in holes 244 (only three are shown) formed in ink stack feed forming body 236. Holes 242 are preferably oriented substantially parallel and adjacent to catch basins 202, and holes 244 are preferably oriented substantially transverse and adjacent to ink supply manifolds 204. Each of cartridge heaters 240 preferably dissipate about 75 watts, withstand a 1,700 volt HIPOT test, are 6.35-centimeters (2.5-inches) long, and are 1.27-centimeter (0.5-inch) in diameter. Cartridge heaters 240 are manufactured by Chromalux Corporation located in Salt Lake City, Utah or by Pacific Heater Corporation located in Pacific, Mo. Alternatively, four 150 watt cartridge heaters may be inserted in holes 242 and holes 244 may be eliminated.

Heaters 240 are conventionally controlled by a thermistor regulated, triac switched AC line powered circuit that further employs an over-temperature protection thermostat. The thermistor is preferably inserted into a well centrally located in catch basin casting 230, and the thermostat is preferably attached to the bottom of ink stack feed forming body 236. Print head 101 is separately heated and thermally controlled.

Skilled workers will recognize that portions of this invention may have alternative embodiments. For example, fluids other than phase-change ink may be employed and may consist of any combination of colors or just a single color, such as black. Likewise, the print head may have a width other than media-width and may employ a wide variety of orifice array configurations. Also, the ink jets may be driven by mechanisms other than the piezo-ceramic transducer described. And, of course, fabrication processes other than laminated plates and castings may be employed, and the various dimensions described may be altered dramatically to suit particular application requirements.

It will be obvious to those having skill in the art that many changes may be made to the details of the above-described embodiments of this invention without departing from the underlying principles thereof. Accordingly, it will be appreciated that this invention is also applicable to imaging applications other than those found in image transfer ink jet printers. The scope of the present invention should, therefore, be determined only by the following claims.

We claim:

1. In a printer for ejecting ink drops of multiple colors from multiple arrays of orifices, an improved ink feed apparatus comprising:

a media-width ink jet print head receiving the multiple colors of ink from associated multiple ink inlet ports for ejection from associated multiple arrays of orifices;

multiple ink supply manifolds storing the multiple colors of ink;

multiple ink stack feeds interconnecting the multiple ink supply manifolds to the associated multiple ink supply ports, each of the multiple ink stack feeds having a substantially equal length and cross-sectional area such that each orifice in the multiple arrays of orifices ejects ink drops having substantially uniform jetting characteristics;

a catch basin associated with each of the multiple colors of ink, each catch basin being connected by a catch basin opening to an associated one of the multiple ink supply manifolds, each of the multiple ink supply manifolds being elongated and oriented substantially parallel to the media-width of the ink jet print head; and multiple heaters each oriented substantially adjacent to the multiple ink supply manifolds and substantially adjacent to one of the catch basins.

2. The apparatus of claim 1 in which the substantially uniform jetting characteristics include at least one of uniform ink drop volumes and uniform ink drop ejection velocities.

3. The apparatus of claim 1 in which each of the multiple ink stack feeds includes a port connecting the ink stack feed to an associated ink supply manifold, a horizontal segment, a vertical segment, and print head interface port connecting the stack feed to an associated one of the ink inlet ports.

4. The apparatus of claim 1 in which multiple ink inlet ports are associated with each of the multiple colors of ink and multiple ink stack feeds interconnect each of the multiple ink supply manifolds to an associated ink inlet port.

5. The apparatus of claim 1 in which three ink inlet ports are associated with each of four colors of ink and three ink stack feeds interconnect each of the four ink supply manifolds to an associated ink inlet port.

6. The apparatus of claim 1 in which the multiple colors of ink include at least two of a yellow ink, a magenta ink, a cyan ink, and a black ink.

7. The apparatus of claim 1 in which the multiple ink supply manifolds are elongated and are oriented substantially parallel to the media-width of the ink jet print head.

8. The apparatus of claim 7 in which each of the multiple ink supply manifolds are at different distances from the ink jet print head and sets of the ink inlet ports associated with each of the multiple colors of ink are at elevationally different locations on the ink jet print head, the ink supply manifolds, ink stack feeds, and colors of ink being arranged such that an ink supply manifold most distant from the ink jet print head is connected to the elevationally lowest ink inlet ports and an ink supply manifold closest to the ink jet print head is connected to the elevationally highest ink inlet ports.

9. The apparatus of claim 1 in which the inks are phase-change inks.

10. The apparatus of claim 1 in further including multiple cartridge heaters each oriented substantially adjacent and transverse to the multiple ink supply manifolds and substantially adjacent to one of the catch basins.

11. The apparatus of claim 10 in which the multiple cartridge heaters are eight cartridge heaters, four of the cartridge heaters being oriented adjacent to associated ones of the ink catch basins and four of the cartridge heaters being oriented substantially transverse to the multiple ink supply manifolds and substantially parallel to associated ones of the ink stack feeds.

12. The apparatus of claim 10 in which the multiple cartridge heaters are four cartridge heaters.

13. The apparatus of claim 11 in which each of the eight cartridge heaters dissipates about 75-watts.

14. The apparatus of claim 12 in which each of the four cartridge heaters dissipates about 150-watts.

* * * * *